US011522907B2

(12) United States Patent
George et al.

(10) Patent No.: US 11,522,907 B2
(45) Date of Patent: *Dec. 6, 2022

(54) APPARATUS AND METHODS FOR MITIGATION OF NETWORK ATTACKS VIA DYNAMIC RE-ROUTING

(71) Applicant: Time Warner Cable Enterprises LLC, St. Louis, MO (US)

(72) Inventors: Wesley George, Manassas, VA (US); Raymond Sliteris, Alexandria, VA (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 345 days.

This patent is subject to a terminal disclaimer.

(21) Appl. No.: 16/459,454

(22) Filed: Jul. 1, 2019

(65) Prior Publication Data

US 2019/0394229 A1 Dec. 26, 2019

Related U.S. Application Data

(62) Division of application No. 15/043,361, filed on Feb. 12, 2016, now Pat. No. 10,341,379.

(51) Int. Cl.
*H04L 9/40* (2022.01)
(52) U.S. Cl.
CPC ...... *H04L 63/1458* (2013.01); *H04L 63/1416* (2013.01)
(58) Field of Classification Search
None
See application file for complete search history.

(56) References Cited

U.S. PATENT DOCUMENTS 6,161,137 A 12/2000 Ogdon et al.
6,810,417 B2 10/2004 Lee
(Continued)

FOREIGN PATENT DOCUMENTS

CA 2920102 A1 2/2015
CA 3101926 A1 8/2019
(Continued)

OTHER PUBLICATIONS

Adams, et al., Protocol Independent Multicast—Dense Mode (PIM-DM): Protocol Specification (Revised), Jan. 2005.
(Continued)

*Primary Examiner* — Fatoumata Traore
(74) *Attorney, Agent, or Firm* — Patent Beach PC

(57) ABSTRACT

Apparatus and methods for mitigating network attacks, such as by dynamically re-routing traffic. Various disclosed embodiments manipulate path-based routing of the backbone network to insert a scrubbing appliance within the backbone network topology, rather than using traditional network addressed tunnels in the edge network. In one implementation, traffic entering the backbone network ingress peer routers (from either another backbone network, or an edge network) is normally destination-address routed via the backbone to its appropriate egress router based on a path label; however, when a Distributed Denial of Service (DDoS) attack is detected, the ingress peer router inserts an additional hop into the path label that redirects dirty traffic to a substantially centralized scrubbing appliance. The benefits of the disclosed solutions include, among other things, significantly reduced attack response/recovery times without significant capital outlays.

20 Claims, 15 Drawing Sheets

(56) References Cited

U.S. PATENT DOCUMENTS

| | | | |
|---|---|---|---|
| 7,154,898 B1 | 12/2006 | Pecus et al. | |
| 7,602,820 B2 | 10/2009 | Helms et al. | |
| 7,793,326 B2 | 9/2010 | McCoskey et al. | |
| 7,954,131 B2 | 5/2011 | Cholas et al. | |
| 8,015,306 B2 | 9/2011 | Bowman | |
| 8,073,940 B1 | 12/2011 | Richardson et al. | |
| 8,141,156 B1 * | 3/2012 | Mao | H04L 45/021 726/23 |
| 8,180,896 B2 | 5/2012 | Sakata et al. | |
| 8,245,259 B2 | 8/2012 | McCoskey et al. | |
| 8,301,776 B2 | 10/2012 | Hebert, I et al. | |
| 8,386,629 B2 | 2/2013 | Tan et al. | |
| 8,432,791 B1 | 4/2013 | Masters | |
| 8,468,271 B1 | 6/2013 | Panwar et al. | |
| 8,510,826 B1 * | 8/2013 | Reams, III | H04L 63/1416 726/22 |
| 8,713,623 B2 | 4/2014 | Brooks | |
| 8,909,736 B1 | 12/2014 | Bosch et al. | |
| 8,924,508 B1 | 12/2014 | Medved et al. | |
| 8,954,491 B1 | 2/2015 | Medved et al. | |
| 8,997,136 B2 | 3/2015 | Brooks et al. | |
| 9,130,970 B2 | 9/2015 | Carney et al. | |
| 9,141,789 B1 * | 9/2015 | Gerlach | H04L 63/1416 |
| 9,160,809 B2 | 10/2015 | Carney et al. | |
| 9,215,423 B2 | 12/2015 | Kimble et al. | |
| 9,235,547 B1 | 1/2016 | Hartman et al. | |
| 9,276,955 B1 * | 3/2016 | Jain | H04L 63/164 |
| 9,350,706 B1 * | 5/2016 | Smith | H04L 63/10 |
| 9,467,369 B2 | 10/2016 | Panagos et al. | |
| 9,743,142 B2 | 8/2017 | Cholas et al. | |
| 9,743,151 B2 | 8/2017 | Patterson et al. | |
| 9,755,950 B2 | 9/2017 | Butler et al. | |
| 9,847,844 B2 | 12/2017 | Schooling et al. | |
| 9,906,838 B2 | 2/2018 | Cronk et al. | |
| 10,070,155 B2 | 9/2018 | Panagos et al. | |
| 11,057,865 B1 | 7/2021 | Curt | |
| 11,070,603 B2 | 7/2021 | Panagos et al. | |
| 2001/0018772 A1 | 8/2001 | Shibata et al. | |
| 2001/0049740 A1 | 12/2001 | Karpoff | |
| 2002/0035683 A1 * | 3/2002 | Kaashoek | H04L 63/1416 713/154 |
| 2002/0059621 A1 | 5/2002 | Thomas et al. | |
| 2002/0116529 A1 | 8/2002 | Hayden | |
| 2002/0142750 A1 | 10/2002 | Gill | |
| 2002/0163935 A1 * | 11/2002 | Paatela | H04L 29/06 370/466 |
| 2003/0028889 A1 | 2/2003 | McCoskey et al. | |
| 2003/0110509 A1 | 6/2003 | Levinson et al. | |
| 2003/0211839 A1 | 11/2003 | Baum et al. | |
| 2004/0010588 A1 | 1/2004 | Slater et al. | |
| 2004/0017769 A1 | 1/2004 | Denecheau et al. | |
| 2004/0039844 A1 | 2/2004 | Bonn | |
| 2005/0089050 A1 | 4/2005 | Cheriton | |
| 2006/0050719 A1 * | 3/2006 | Barr | H04L 45/00 370/401 |
| 2006/0130113 A1 | 6/2006 | Carlucci et al. | |
| 2006/0190589 A1 | 8/2006 | Parker et al. | |
| 2006/0198394 A1 | 9/2006 | Gotoh et al. | |
| 2006/0282891 A1 * | 12/2006 | Pasko | H04L 63/0209 726/23 |
| 2007/0011717 A1 | 1/2007 | Lauder et al. | |
| 2007/0091793 A1 | 4/2007 | Filsfils et al. | |
| 2007/0101379 A1 | 5/2007 | Pereira et al. | |
| 2007/0107010 A1 | 5/2007 | Jolna et al. | |
| 2008/0115167 A1 | 5/2008 | Hermsmeyer et al. | |
| 2008/0235746 A1 | 9/2008 | Peters et al. | |
| 2009/0083279 A1 | 3/2009 | Hasek | |
| 2009/0100459 A1 | 4/2009 | Riedl et al. | |
| 2009/0138601 A1 | 5/2009 | Hebert, I et al. | |
| 2009/0161674 A1 | 6/2009 | Bou-Diab et al. | |
| 2009/0210899 A1 | 8/2009 | Lawrence-Apfelbaum et al. | |
| 2009/0210912 A1 | 8/2009 | Cholas et al. | |
| 2009/0217324 A1 | 8/2009 | Massimi | |
| 2009/0248886 A1 | 10/2009 | Tan et al. | |
| 2009/0260046 A1 | 10/2009 | Yang | |
| 2009/0313330 A1 | 12/2009 | Sakamoto | |
| 2010/0036954 A1 | 2/2010 | Sakata et al. | |
| 2010/0115565 A1 | 5/2010 | Fujihira et al. | |
| 2010/0121969 A1 | 5/2010 | Levitan | |
| 2010/0128918 A1 | 5/2010 | Macwan | |
| 2010/0231790 A1 | 9/2010 | Ansari et al. | |
| 2010/0313215 A1 | 12/2010 | McCoskey et al. | |
| 2010/0313223 A1 | 12/2010 | Straub | |
| 2010/0332595 A1 | 12/2010 | Fullagar et al. | |
| 2011/0103374 A1 | 5/2011 | Lajoie et al. | |
| 2011/0131180 A1 | 6/2011 | Tuli et al. | |
| 2011/0154213 A1 | 6/2011 | Wheatley et al. | |
| 2011/0231475 A1 | 9/2011 | Van Der Merwe et al. | |
| 2011/0302600 A1 | 12/2011 | Kelsen et al. | |
| 2011/0320300 A1 | 12/2011 | Broms et al. | |
| 2012/0008786 A1 | 1/2012 | Cronk et al. | |
| 2012/0023535 A1 | 1/2012 | Brooks | |
| 2012/0110202 A1 | 5/2012 | Niman | |
| 2012/0151012 A1 | 6/2012 | Mustafa | |
| 2012/0278312 A1 | 11/2012 | McCoskey et al. | |
| 2013/0018978 A1 | 1/2013 | Crowe et al. | |
| 2013/0044758 A1 * | 2/2013 | Nguyen | H04L 45/306 370/401 |
| 2013/0104180 A1 | 4/2013 | Knightbridge | |
| 2013/0121339 A1 | 5/2013 | Dispensa et al. | |
| 2013/0159472 A1 | 6/2013 | Newton et al. | |
| 2013/0188645 A1 | 7/2013 | Mack-Crane | |
| 2013/0262697 A1 | 10/2013 | Karasaridis et al. | |
| 2013/0268856 A1 | 10/2013 | Hejl, Jr. et al. | |
| 2013/0318195 A1 | 11/2013 | Kwapniewski et al. | |
| 2014/0006158 A1 | 1/2014 | Cooper | |
| 2014/0036663 A1 | 2/2014 | Narayanan | |
| 2014/0095491 A1 | 4/2014 | McCoskey et al. | |
| 2014/0149552 A1 | 5/2014 | Carney et al. | |
| 2014/0149601 A1 | 5/2014 | Carney et al. | |
| 2014/0164760 A1 | 6/2014 | Hybertson et al. | |
| 2014/0321561 A1 | 10/2014 | Stec et al. | |
| 2015/0003517 A1 | 1/2015 | Misumi | |
| 2015/0040173 A1 | 2/2015 | Panagos et al. | |
| 2015/0063249 A1 | 3/2015 | Jover et al. | |
| 2015/0074187 A1 | 3/2015 | Fletcher et al. | |
| 2015/0074697 A1 | 3/2015 | Van et al. | |
| 2015/0113164 A1 | 4/2015 | Butler et al. | |
| 2015/0161651 A1 | 6/2015 | Rodriguez et al. | |
| 2015/0271541 A1 | 9/2015 | Gonder et al. | |
| 2017/0026712 A1 | 1/2017 | Gonder et al. | |
| 2017/0099212 A1 | 4/2017 | Panagos et al. | |
| 2018/0014041 A1 | 1/2018 | Chen et al. | |
| 2018/0041818 A1 | 2/2018 | Patterson et al. | |
| 2019/0069003 A1 | 2/2019 | Panagos et al. | |
| 2019/0069004 A1 | 2/2019 | Badawiyeh | |
| 2019/0069037 A1 | 2/2019 | Murphy | |
| 2019/0268393 A1 | 8/2019 | Panagos et al. | |
| 2019/0272358 A1 | 9/2019 | McCoskey et al. | |
| 2020/0274790 A1 | 8/2020 | Panagos et al. | |
| 2020/0389708 A1 | 12/2020 | Patterson et al. | |
| 2021/0352123 A1 | 11/2021 | James | |

FOREIGN PATENT DOCUMENTS

| | | |
|---|---|---|
| EP | 3028415 B1 | 2/2019 |
| WO | WO-2015017816 A1 | 2/2015 |
| WO | WO-2019165468 A1 | 8/2019 |

OTHER PUBLICATIONS

Bhattacharyy, An Overview of Source-Specific Multicast, Jul. 2003.

Cain, et al., Internet Group Management Protocol, Version 3, Oct. 2002.

Fenner, et al., Internet Group Management Protocol (IGMP)/ Multicast Listener Discovery (MLD)-Based Multicast Forwarding (IGMP/ MLD Proxying), IETF RFC 4605, Aug. 2006.

Fernanda, et al., : "Anycast as a Load Balancing feature", USENIX, Aug. 27, 2010 (Aug. 27, 2010), pp. 1-4, XP061010498, [retrieved on Aug. 27, 2010].

Handley, et al., Bidirectional Protocol Independent Multicast (BIDIR-PIM), Oct. 2007.

(56) References Cited

OTHER PUBLICATIONS

Holbrook, et al., Using Internet Group Management Protocol Version 3 (IGMPv3) and Multicast Listener Discovery Protocol Version 2 (MLDv2) for Source-Specific Multicast, Aug. 2006.

Marques, et al., "Advertisement of the best external route in BGP; draft-ietf-idr-best-external-05.txt", Advertisement of the Best External Route in BGP; draft-ietf-idr-best-external-05.txt, Internet Engineering Task Force, IETF; Standardworkingdraft, Internet Society (ISOC) 4, Rue Des Falaises CH-1205 Geneva, Switzerland, Jan. 3, 2012 (Jan. 3, 2012), pp. 1-21, XP015079961, [retrieved on Jan. 3, 2012].

Mohapatra, et al., "Fast Connectivity Restoration Using BGP Add-path; draft-pmohapat-idr-fast-conn-restore-03.txt", Fast Connectivity Restoration Using BGP Add-Path; draft-pmohapat-idr-fast-conn-restore-03.txt, Internet Engineering Task Force, IETF; Standardworkingdraft, Internet Society (ISOC) 4, Rue Des Falaises CH-1205 Geneva, Switzerland, Jan. 22, 2013 (Jan. 22, 2013), pp. 1-19, XP015089608, [retrieved on Jan. 22, 2013].

NAT—Network Address Translation web pages retrieved from the Internet Apr. 17, 2015 (http://www.karlrupp/net/en/computer/nat_tutorial).

Raszuk, et al., "Distribution of Diverse BGP Paths; RFC6774.txt", Distribution of Diverse BGP Paths; RFC6774.txt, Internet Engineering Task Force, IETF; Standard, Internet Society (ISOC) 4, Rue Des Falaises CH-1205 Geneva, Switzerland, Nov. 6, 2012 (Nov. 6, 2012), pp. 1-22, XP015086470, [retrieved on Nov. 6, 2012].

Vida, et al., Multicast Listener Discovery Version 2 (MLDV2) for IPv6, Jun. 2004.

Wing, et al., IP Multicast Requirements fora Network Address Translator (NAT) and a Network Address Port Translator (NAPT), IETF RFC 5135, Feb. 2008.

\* cited by examiner

APPARATUS AND METHODS FOR MITIGATION OF NETWORK ATTACKS VIA DYNAMIC RE-ROUTING

PRIORITY

The present application is a divisional of and claims priority to co-owned and co-pending U.S. patent application Ser. No. 15/043,361 of the same title filed on Feb. 12, 2016, and issuing as U.S. Pat. No. 10,341,379 on Jul. 2, 2019, which is incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

1. Technological Field

The present disclosure relates generally to the field of networking data center operations, and specifically in one aspect, to apparatus and methods for mitigation of network attacks by dynamically re-routing network traffic, including e.g., enhancements to network operation such as improved response/recovery times, and reduced network management overhead and overall capital expenditures.

2. Description of Related Technology

The Internet is a network of networks that consists of private, public, academic, business, and government networks that are connected via so-called "backbone" networks. Backbone networks link data centers, where each data center locally distributes network traffic to edge routers and so-called "last mile" delivery networks. The "last mile" is a common colloquialism referring to the portion of the telecommunications network chain that physically reaches the end or destination premises. Generally, backbone services are provided by a commercial wholesale bandwidth provider who guarantees certain Quality of Service (QOS) or Service Level Agreements (SLAs) to e.g., a retailer (e.g., Internet Service Provider (ISP)), network operator (e.g., cellular network operator), etc.

Malicious activity is an issue for the Internet generally; however, backbone service providers are especially concerned with network "attacks" that overwhelm network equipment with malicious data. For example, one common network attack is a so-called "Distributed Denial of Service" (DDoS) attack that attempts to temporarily or indefinitely interrupt or suspend services of a host connected to the Internet. DDoS attacks commonly involve a so-called "botnet" (computers that have been infected with malware) that repeatedly request service from a target host; the target host is flooded with dummy service requests and accordingly cannot service legitimate requests. The number and strength of DDoS attacks on the Internet have increased at an accelerating rate. In 2010, a DDoS attack in the tens of Gbps (Gigabits per second) would be considered "large" with most capping out at 100 Gbps; in 2014, such attacks have escalated to 400-500 Gbps using various new User Datagram Protocol (UDP) reflection techniques.

Conceptually, filtering out DDoS attacks require that the backbone service provider routes "dirty" traffic to specialized scrubbing appliances that filter out illegitimate traffic, and forward the "cleaned" traffic to the target server (typically, a more specific route is injected into the service provider's routing table that is seen as more preferred than the existing route, so that all traffic destined for the given host is intercepted and redirected to the scrubbing appliances). Since DDoS attacks could originate from any number of source addresses, dirty traffic is primarily identified by its intended destination (the target or victim host, such as e.g., a server). Unfortunately, directly re-introducing the cleaned traffic to the network creates a new problem; specifically, cleaned traffic with the target host address is processed as if "dirty", and re-routed to the scrubbing appliance in an endless network loop. For instance, in one such case, the "cleaned" traffic simply follows the route injected to intercept the mix of clean & dirty traffic, because there can be only one "best path" (and the network doesn't know the difference between clean and dirty traffic).

In actual implementation, dirty network traffic is directed to the scrubbing appliance, and the cleaned traffic is isolated from other network traffic and provided to the target host. Typically, isolation is performed with software "tunnels" (e.g., via virtual private networks or VPNs), or hardware cabling e.g., a direct logical or physical connection between two distinct nodes of the same network. From a practical standpoint, modifying the network topology to insert the scrubbing appliance requires significant manual intervention; anecdotally, this process can take days, if not weeks, during which service to the target host is degraded or disabled. While the tunnel is being configured, the network traffic to the target host is handled via e.g., a Remotely Triggered Black Hole (RTBH) service which indiscriminately discards all traffic destined for the victim host. Such delays and complete "blackouts" are often unacceptable to customers or users operating the target host, thereby resulting in increased customer or user dissatisfaction with the service provider and potentially lost revenue. Moreover, customers or users exposed to one or more such service interruptions are much more likely to switch service providers.

It is noted that alternate mechanisms to reduce the cycle time of the foregoing manual intervention may be implemented, such as e.g., automation; however, implementing suitable automation mechanisms has its own challenges (including significant delay), such that this approach is not optimal for many service providers.

In addition, one alternative approach to using the aforementioned RTBH, is for the service provider to do nothing until the selected mitigation mechanism is ready. Thus, the DoS attack in such cases is successful, and may cause impact to other hosts sharing resources, e.g., firewalls, network segments, etc.

It is also noted that, generally speaking, the longer the DDoS attack is allowed to continue without a mitigating response, the more severe and widespread it can become. This is largely due to often unchecked propagation of the malware across the Internet and other connected LANs, MANs, WANs, etc., such as via the foregoing unwitting user becoming infected with a "bot". Hence, DDoS attacks which are "nipped in the bud" generally result in fewer impacts on the customer or user, as well as the service provider; time to implement mitigating measures is a very significant factor for the service provider (and the customer/user).

The converse may also be true—often, DDoS attacks are targeted for short-term disruption (e.g., "booters" in the gaming community), and are fairly ephemeral. Accordingly, it is often impractical to try to protect against such brief attacks unless the system to mitigate them is substantially flexible and agile, and can effectively respond in such brief periods of time. Otherwise, the attack may be terminated before mitigation is even implemented.

Additionally, tunneling the scrubbing appliance to the target server is optimally performed over short distances; thus, the scrubbing appliance should be within close proximity to the target host. At current market prices (circa 2015), each scrubbing appliance costs approximately one (1) million USD. At these prices, deploying numerous scrubbing appliances across the United States is an economically untenable proposition. Moreover, even targeted deployments to remedy DDoS attacks significantly impacts a backbone service provider's "bottom line".

Accordingly, improved solutions are needed to rapidly neutralize network attacks such as e.g., DDoS attacks. In particular, solutions should be able to mitigate attacks without requiring the often lengthy and laborious construction of tunnels from the scrubber to the target server or host. An optimal solution would be disposed at least proximate (topology-wise) to the sources of incoming attack traffic, and may include in some cases substantially centralized scrubbing appliances, rather than performing scrubbing from individual data centers at the edge of the network. Preferably, where used, a centralized scrubbing appliance location could service the national/regional coverage footprint in a limited number (e.g., one or two) operations management complexes.

Moreover, from a procurement standpoint, desirable solutions should be vendor agnostic (so as to allow for competitive bidding), and leverage existing equipment solutions for detecting attacks and triggering mitigation. Practical implementations should provide for sufficient throughput and processing capacity, with response times on the order of seconds or minutes from attack detection.

SUMMARY

The present disclosure addresses the foregoing needs by providing, inter alia, methods and apparatus for mitigating network attacks by, e.g., dynamically re-routing network traffic.

In one aspect of the disclosure, a method of operating a network so as to mitigate effects of malicious attacks on users of the network is disclosed. In one embodiment, the method includes: identifying traffic of the network associated with one or more malicious attacks, at least a portion of the identified traffic including destination data; inserting a Multiprotocol Label Switching (MPLS) protocol path label into the identified traffic, the inserted label enabling MPLS label switch path (LSP)-based, next-hop switching of the identified traffic; switching the identified traffic to a processing entity based at least on the inserted data; processing the switched identified traffic using the processing entity so as to render the switched identified traffic non-harmful to the network; and routing the processed routed identified traffic to a destination associated with the destination data.

In one variant, the malicious attacks comprise distributed denial-of-service (DDoS) attacks that are originated from an internetwork in data communication with the network.

In another variant, the foregoing method is performed without use of a virtual route and forward (VRF) function or process.

In another variant, the inserting data into the identified traffic comprises inserting the Multiprotocol Label Switching (MPLS) protocol path label into at least a portion of a plurality of data packets of the identified traffic using a substantially centralized router apparatus of the network. The network comprises for instance a managed content distribution network having a plurality of subscribers, the malicious attacks comprise denial-of-service (DoS) attacks (e.g., DDoS) that are originated from an internetwork in data communication with the managed content distribution network, and the substantially centralized router apparatus comprises a router associated with a backbone network within the managed content distribution network.

In another aspect, a method of operating a managed content distribution network in data communication with an internetwork, so as to compensate for malicious internetwork-originated attacks directed at host devices or subscribers of the network is disclosed. In one embodiment, the method includes: processing packetized data traffic received by the network from the internetwork so as to identify at least portions of the traffic associated with one or more malicious denial-of-service (DoS) attacks, the identified traffic including a destination address corresponding to consumer premises equipment (CPE) at least one subscriber of the network; inserting, using at least one router disposed substantially proximate an data traffic ingress point of the network, data into the identified traffic via a Multiprotocol Label Switching (MPLS) protocol label, the inserting preserving the destination address for subsequent use by the network; subsequent to the inserting, switching the identified traffic to a processing entity within the content distribution network based at least on the inserted data of the label; and processing the switched identified traffic using the processing entity so as to cause at least one of (i) filtration of at least a portion of the switched identified traffic, and/or (ii) re-switching of at least a portion of the switched identified traffic to an intermediate destination.

In one variant, the processing packetized data traffic, inserting data, switching the identified traffic, and processing the switched identified traffic cooperate to enable the CPE to continue operation after the one or more malicious DoS attacks have been initiated, and at least the inserting, switching and processing are conducted substantially automatically using computerized processes of one or more of the managed content distribution network, the router, and/or the processing entity so as to minimize delays in providing the compensation.

In yet another aspect, a network architecture configured to at least mitigate one or more effects of external attacks on one or more users of a data network is disclosed. In one embodiment, the architecture includes: a network interface configured to communicate a plurality of data packets with an external network, the plurality of packets having routing data associated with a first layer of the network; a scrubbing apparatus configured to remediate data packets forwarded thereto; and a processing apparatus in data communication with the network interface and the scrubbing apparatus, and configured to process a plurality of identified data packets so as to enable redirection of the processed identified packets directly to the scrubbing apparatus for remediation thereof, and with alteration of the routing data for only a specific subset of routers within the network.

In one variant, the first layer of the network comprises a networking protocol layer; the routing data comprises at least Internet Protocol (IP) routing data; and the processing of a plurality of identified data packets so as to enable redirection of the processed identified packets, comprises insertion of data associated with a second layer of the network different from the networking protocol layer.

In another variant, the architecture comprises a centralized architecture, and the processing apparatus comprises a router apparatus disposed at a substantially centralized node of the data network and in data communication with at least one backbone portion thereof, the substantially centralized node configured to receive a majority of backbone traffic for the data network so as to permit centralization of evaluation of the backbone traffic for potential scrubbing by the scrubbing apparatus.

In yet another variant, the processing apparatus comprises a router apparatus disposed substantially proximate (topologically) a data ingress point of the data network and in data communication with at least one backbone portion thereof. The router apparatus is configured to receive a majority of backbone traffic for the data network so as to permit centralization of evaluation of the backbone traffic for potential scrubbing by the scrubbing apparatus.

In a further aspect, a method of processing data packets in a packet protocol data network is disclosed. In one embodiment, the method includes: receiving a plurality of data packets destined for a particular network address at a processing entity, the network address specified by a network-layer protocol associated with the network; evaluating at least a portion of the received packets (e.g., matching IP packet header information on incoming packets to pre-programmed routing data to determine the proper exit interface(s) (or path(s)) from the router, and then store/forwarding packets to the identified interface(s)); inserting a switching-layer protocol address into at least a portion of the identified plurality of packets while not altering the network (e.g., IP) address; utilizing the inserted switching-layer protocol address to route the at least portion of the identified plurality of packets to a second processing entity, the second processing entity configured to remediate the at least portion of the identified plurality of packets; performing remediation on the at least portion of the identified plurality of packets; and subsequent to the remediation, routing at least some of the remediated at least portion of packets to the network address.

In one variant, the network layer protocol comprises at least an Internet Protocol (IP), and the inserting a switching-layer protocol address comprises inserting a Multiprotocol Label Switching (MPLS) protocol-compliant label.

In another variant, the acts of receiving, evaluating, inserting, and utilizing are performed at one or more router apparatus disposed at a substantially centralized location within the packet protocol data network, and the one or more router apparatus comprise an initial data packet ingestion router in data communication with the Internet and a backbone of the packet protocol data network.

In still another aspect, router apparatus for use within a data network (e.g., a managed content distribution network) is disclosed. In one embodiment, the router apparatus includes: processing apparatus; a data packet interface in data communication with the processing apparatus and configured to at least receive a plurality of data packets originated from an internetwork, the plurality of data packets destined for a particular network address, the network address specified by a network-layer protocol associated with the data network; storage apparatus in data communication with the processing apparatus, the storage apparatus configured to store at least the plurality of received data packets; and computerized logic in data communication with the processing apparatus.

In one variant, the computerized logic is configured to: store the received plurality of data packets at least temporarily in the storage apparatus; evaluate at least a portion of the received plurality of packets to identify a plurality of packets associated with a network attack; insert a switching-layer protocol address into at least a portion of the identified plurality of packets while not altering the network (e.g., IP) address; and utilize the inserted switching-layer protocol address to switch the at least portion of the identified plurality of packets to a remediation entity, the remediation entity configured to process the at least portion of the identified plurality of packets so as to substantially frustrate the network attack.

In one implementation, the router apparatus further includes: a second processing apparatus; a second data packet interface in data communication with the second processing apparatus and configured to at least receive the at least portion of the identified plurality of data packets processed by the remediation entity; second storage apparatus in data communication with the second processing apparatus, the storage apparatus configured to at least temporarily store at least the at least portion of the identified plurality of data packets processed by the remediation entity; and second computerized logic in data communication with the second processing apparatus and configured to switch at least some of the at least portion of identified plurality of data packets to the network address via at least a backbone of the data network.

In another aspect, a method of reducing the reaction time to a network DDoS or other Internet-based attack is disclosed.

In a further aspect, a method of reducing cost of improvements needed to intervene in a network DDoS or other Internet-based attack is disclosed.

In still a further aspect, a non-transitory computer readable storage apparatus is disclosed. In one embodiment, the storage apparatus is part of a network router apparatus and includes at least one computer program which is configured to, when executed by a processor on the routing apparatus, insert appropriate lower-layer labels (e.g., MPLS labels) or data on data packets being routed through a network backbone so as to permit the labeled data packets to be directly switched to a remediation center.

These and other aspects shall become apparent when considered in light of the disclosure provided herein.

BRIEF DESCRIPTION OF THE DRAWINGS

FIG. 4b is a logical block diagram of the MSO backbone of FIGS. 4-4a, showing general routing and flow of "dirty" traffic after detection of the DDoS attack of FIG. 4a.

Figure 1:
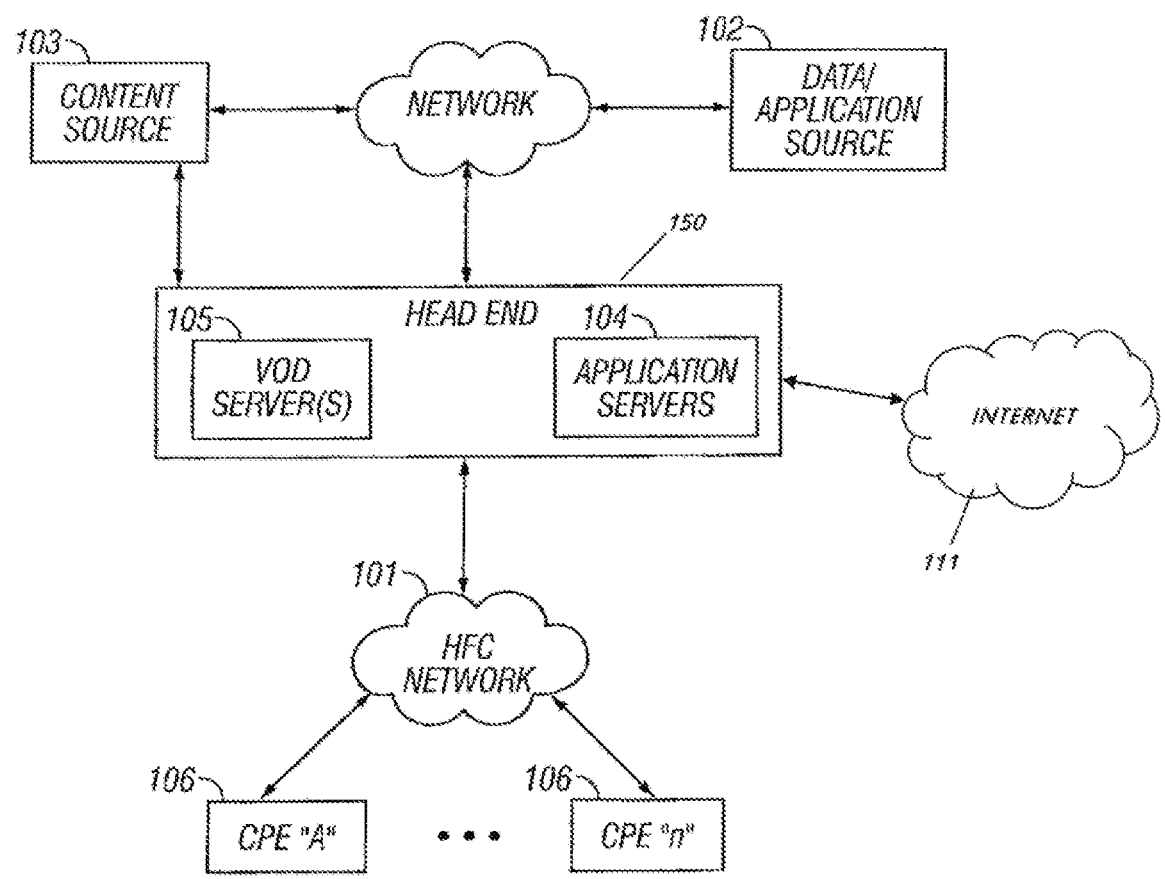
FIG. 1 is a functional block diagram illustrating an exemplary hybrid fiber network configuration useful with various aspects of the present disclosure.

All figures © Copyright 2015-2016 Time Warner Enterprises LLC. All rights reserved.

DETAILED DESCRIPTION

Reference is now made to the drawings wherein like numerals refer to like parts throughout.

As used herein, the term "application" refers generally and without limitation to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could include a downloadable Java Xlet™ that runs within the JavaTV™ environment.

As used herein, the term "client device" includes, but is not limited to, set-top boxes (e.g., DSTBs), gateways, modems, personal computers (PCs), and minicomputers, whether desktop, laptop, or otherwise, and mobile devices such as handheld computers, PDAs, personal media devices (PMDs), tablets, "phablets", and smartphones.

As used herein, the term "codec" refers to a video, audio, or other data coding and/or decoding algorithm, process or apparatus including, without limitation, those of the MPEG (e.g., MPEG-1, MPEG-2, MPEG-4/H.264, etc.), Real (Real-Video, etc.), AC-3 (audio), DiVX, XViD/ViDX, Windows Media Video (e.g., WMV 7, 8, 9, 10, or 11), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

The term "Customer Premises Equipment (CPE)" refers without limitation to any type of electronic equipment located within a customer's or subscriber's premises and connected to or in communication with a network.

As used herein, the term "display" means any type of device adapted to display information, including without limitation CRTs, LCDs, TFTs, plasma displays, LEDs (e.g., OLEDs), incandescent and fluorescent devices, or combinations/integrations thereof. Display devices may also include less dynamic devices such as, for example, printers, e-ink devices, and the like.

As used herein, the term "DOCSIS" refers to any of the existing or planned variants of the Data Over Cable Services Interface Specification, including for example DOCSIS versions 1.0, 1.1, 2.0, 3.0 and 3.1.

As used herein, the term "headend" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet.

As used herein, the terms "Internet" and "internet" are used interchangeably to refer to inter-networks including, without limitation, the Internet.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "processor" or "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable computer fabrics (RCFs), array processors, secure microprocessors, and application-specific integrated circuits (ASICs). Such digital processors may be contained on a single unitary IC die, or distributed across multiple components.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, H.323, etc.).

As used herein, the term "network interface" refers to any signal or data interface with a component or network including, without limitation, those of the FireWire (e.g., FW400, FW800, etc.), Thunderbolt, USB (e.g., USB2.0, USB 3.0, etc.), Ethernet (e.g., 10/100, 10/100/1000 (Gigabit Ethernet), 10-Gig-E, etc.), MoCA, Coaxsys (e.g., TVnet™), radio frequency tuner (e.g., in-band or OOB, cable modem, etc.), Wi-Fi (802.11), WiMAX (802.16), Zigbee®, Z-wave, PAN (e.g., 802.15), power line carrier (PLC), or IrDA families.

As used herein, the term "QAM" refers to modulation schemes used for sending signals over cable networks. Such modulation scheme might use any constellation level (e.g. QPSK, 16-QAM, 64-QAM, 256-QAM, etc.) depending on details of a cable network. A QAM may also refer to a physical channel modulated according to the schemes.

As used herein, the term "routing protocol" refers without limitation to path-based protocols such as Multiprotocol Label Switching (MPLS) such as per RFCs 3469, 5462, 4364 (each of the foregoing incorporated herein by reference in its entirety), Generalized Multiprotocol Label Switching (GMPLS), and other protocols and architectures such as content-addressable memory (CAM), ternary CAM (TCAM), Shortest Path Bridging (SPB) per III Std. 802.1aq, Provider Backbone Bridges (PBB), MPLS-TP, and L2TPv3.

As used herein, the term "server" refers to any computerized component, system or entity regardless of form which is adapted to provide data, files, applications, content, or other services to one or more other devices or entities on a computer network.

As used herein, the term "storage" refers to without limitation computer hard drives, DVR device, memory, RAID devices or arrays, optical media (e.g., CD-ROMs, Laserdiscs, Blu-Ray, etc.), or any other devices or media capable of storing content or other information.

As used herein, the term "Wi-Fi" refers to, without limitation, any of the variants of IEEE-Std. 802.11 or related standards including 802.11 a/b/g/n/s/v/ac or 802.11-2012.

As used herein, the term "wireless" means any wireless signal, data, communication, or other interface including without limitation Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, Zigbee®, Z-wave, narrowband/FDMA, OFDM, PCS/DCS, LTE/LTE-A, analog cellular, CDPD, satellite systems, millimeter wave or microwave systems, acoustic, and infrared (i.e., IrDA).

Overview

As previously noted, Distributed Denial of Service (DDoS) attacks can originate from virtually any network address of the Internet. Since a scrubbing appliance cannot re-introduce cleaned traffic into dirty traffic without creating a network routing loop, prior art solutions have always involved isolation mechanisms that are in close proximity to the target server. More directly, conventional wisdom has always believed that the confluence of these two problems (an unknown origin of attack, and a requirement to isolate dirty and cleaned traffic) dictate that the solution must be performed as close to the destination target server as possible.

In contrast, the inventors of the present disclosure have conceptually recognized that, rather than treating the entire Internet as an undifferentiated whole which handles "hop"-routed traffic, a backbone provider's ingress and egress peer routers which route traffic according to "path"-routed schemes can be leveraged in the context of mitigating network-based attacks. For reasons described in greater detail herein, path-based routing can be manipulated in a manner that is not subject to the same network routing loop constraints as hop-based routing. Intelligent configuration of path-based routing advantageously enables a network provider to, inter alia, situate a scrubbing complex at any point in the backbone network topology.

In one exemplary implementation of the present disclosure, traffic entering the backbone network ingress peer routers (from either another backbone network, or an edge network) is normally path-routed via the backbone to its appropriate egress router based on a path label; however, when a malicious attack is detected, the ingress peer router inserts an additional "hop" into the path label that redirects any dirty traffic to a scrubbing appliance. In one exemplary variant, the backbone network operates according to a Multiprotocol Label Switching (MPLS) protocol, which routes variable length data from one network node to another based on path labels created by the peer router, rather than looking up e.g., IP network addresses for the "next hop" in route tables of intermediary nodes. Within the context of MPLS, the route switching is performed by inserting a label for the scrubbing complex, which routes the traffic through the scrubbing complex to the egress router. Since the MPLS label manipulation occurs solely within the backbone network, the network addressing is advantageously unaffected (routing based on TCP/IP and UDP/IP at the edge networks is unchanged).

As is described in greater detail hereinafter, the disclosed solutions provide a number of benefits and advantages over prior art techniques, not least of which is a greatly reduce attack response time and recovery time, all without significant capital outlays. For example, unlike prior art solutions which required (largely manually configured) isolation mechanisms such as software tunneling, direct cabling, etc., the exemplary disclosed embodiments insert an additional path into a label string; path manipulations can thereafter be automated (e.g., so as to take advantage of the dynamic nature of the network's routing tables (such as BGP) to program changes rapidly, as contrasted with prior art "automation" of otherwise manual configuration changes, as discussed supra), and do not require manual intervention. Thus, attack mitigation can occur in mere seconds or minutes of detection as compared to days or weeks under prior art regimes.

Additionally, the disclosed solutions enable optional geographic consolidation of scrubbing appliances. As previously noted, since links can be added to a path label without introducing a network loop, the scrubbing appliances can advantageously be introduced at literally any point in the routing path. This flexibility decouples geographic limitations on routing. Accordingly, in one embodiment of the present disclosure, dirty traffic is routed to a centralized scrubbing appliance(s). Centralized scrubbing reduces the backbone network provider's overall maintenance and support overhead, and enables economies of scale. For example, the entire national/regional coverage footprint can be serviced from the same data center and maintenance personnel. Additionally, malicious attacks can be quickly resolved regardless of where the target server is located (i.e., a scrubbing appliance does not need to be deployed within close proximity of the victim server). Finally, the ability to intelligently combine and/or divide network resources (e.g., scrubbing appliances) without geographic constraints enables economies of scale for a large network applications.

While all single vendors ensure that their products are compatible with their own product offerings, vendor cross-compatibility is not assured, and such issues may complicate e.g., monitoring, compliance, etc. The ability to source interchangeable components from multiple different vendors ensures market competition and promotes technical innovation. The various disclosed embodiments do not require specialized functionality, and can be easily handled by commodity components, thus greatly reducing or even eliminating cross-compatibility issues and enabling significant multi-source opportunities. More directly, backbone network providers that can source network components from multiple vendors can reduce capital expenditure costs through bidding and competition.

Other features and advantages of the present disclosure will immediately be recognized by persons of ordinary skill in the art with reference to the attached drawings and detailed description of exemplary embodiments as given below.

DETAILED DESCRIPTION OF EXEMPLARY EMBODIMENTS

Exemplary embodiments of the apparatus and methods of the present disclosure are now described in detail. While these exemplary embodiments are described primarily in the context of a hybrid fiber coax (HFC) cable architecture having a multiple systems operator (MSO), digital networking capability, IP delivery capability, and a plurality of client devices/CPE, the general principles and advantages of the disclosure may be extended to other types of networks and architectures that are configured to deliver digital e.g., media data (e.g., text, video, and/or audio) or other data. Such other networks or architectures may be broadband, narrowband, wired or wireless, or otherwise, the following therefore being merely exemplary in nature.

It will also be appreciated that while described generally in the context of a network providing backbone services to users or subscribers of the commercial HFC network referenced above for the broader Internet, the present disclosure may be readily adapted to other types of environments including, e.g., commercial/enterprise, and government/military applications, and/or other types of internetworks. Myriad other applications are possible.

While the terms "ingress" and "egress" are used with reference to the various functions of the nodes described herein, it should be appreciated that such usage is provided solely for clarity, and is not in any way determinative or dispositive of a location or other attribute of a component, system or process. In fact, it is readily appreciated that typical nodes, applications, and/or transactions are bidirectional in nature, and thus nodes may possess both ingress and egress capabilities.

Also, while certain aspects are described primarily in the context of the well-known Internet Protocol (described in, inter alia, *Internet Protocol DARPA Internet Program Protocol Specification*, IETF RCF 791 (September 1981) and Deering, et al., *Internet Protocol, Version 6 (IPv6) Specification*, IETF RFC 2460 (December 1998) each of which is incorporated herein by reference in its entirety) and the associated Transport Control Protocol (TCP), it will be appreciated that the present disclosure may utilize other types of protocols (and in fact bearer networks to include other internets and intranets) to implement the described functionality.

Lastly, it is noted that while a certain scheme or model (e.g., OSI model, Layers 1, 2, 3, etc.) for network layering or construction are referenced herein, the various aspects of the disclosure are in no way limited to such descriptions, models or schemes.

Other features and advantages of the present disclosure will immediately be recognized by persons of ordinary skill in the art with reference to the attached drawings and detailed description of exemplary embodiments as given below.

Service Provider Network—

FIG. 1 is a block diagram illustrating a typical service provider network system useful for delivery of content and data to a consumer premises equipment (CPE). The service provider network is supported by an underlying backbone network (see Exemplary Backbone Network, discussed infra).

The various components of the service provider network 100 include (i) one or more data and application origination points 102; (ii) one or more content sources 103, (iii) one or more application distribution servers 104; (iv) one or more VOD servers 105, and (v) customer premises equipment (CPE) 106. The distribution server(s) 104, VOD servers 105 and CPE(s) 106 are connected via a bearer (e.g., HFC) network 101. A simple architecture comprising one of each of the aforementioned components 102, 103, 104, 105, 106 is shown in FIG. 1 for simplicity, although it will be recognized that comparable architectures with multiple origination points, distribution servers, VOD servers, and/or CPE devices (as well as different network topologies) may be utilized consistent with the present disclosure.

Figure 1A:
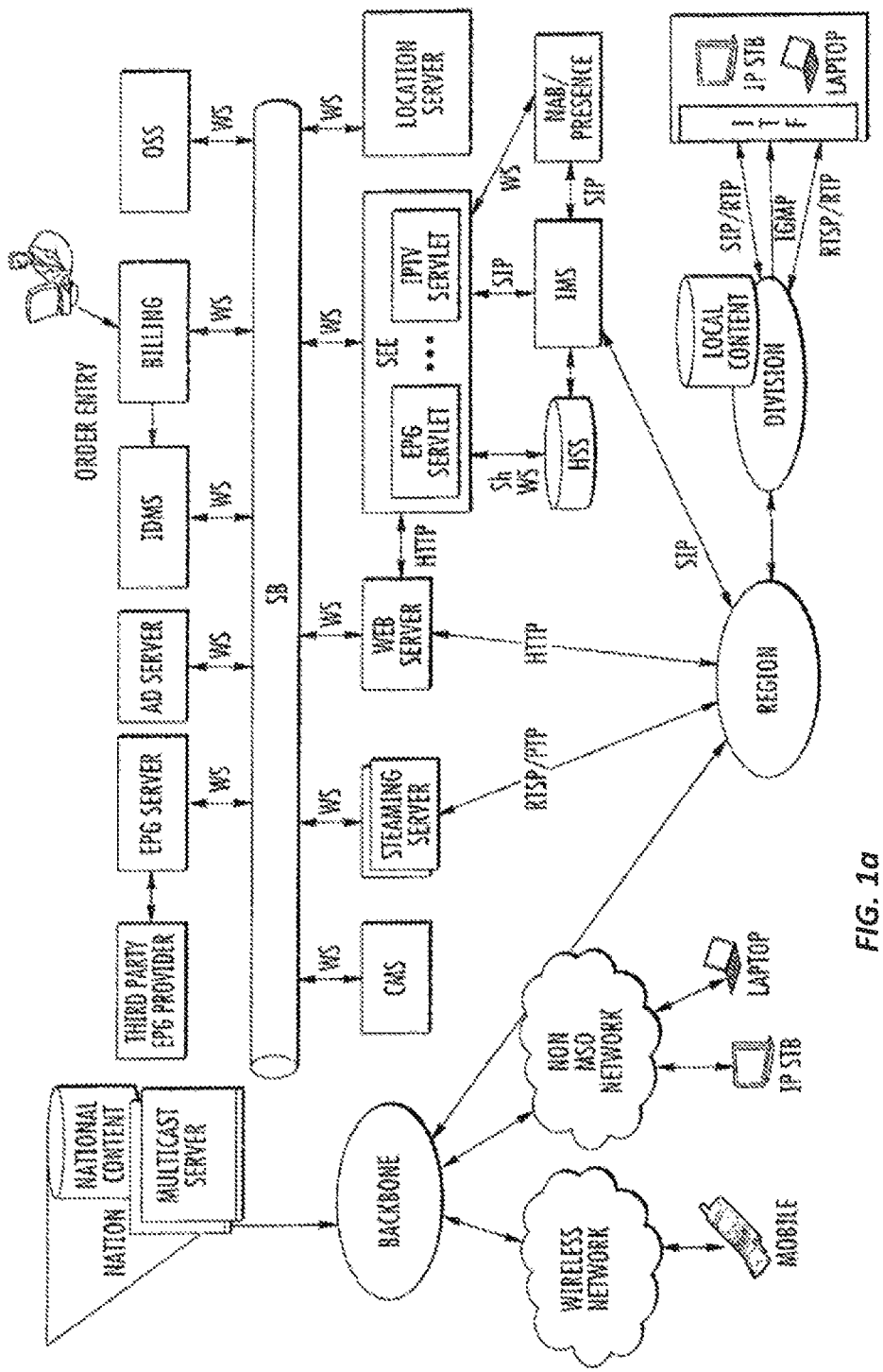
FIG. 1a is a functional block diagram illustrating one exemplary packetized content delivery network architecture useful with various aspects of the present disclosure.

FIG. 1*a* illustrates one exemplary implementation of the network of FIG. 1, in the exemplary context of a 3GPP IMS (IP Multimedia Subsystem) network with common control plane and service delivery platform (SDP), as described in co-pending U.S. Provisional Patent Application Ser. No. 61/256,903 filed Oct. 30, 2009 and entitled "METHODS AND APPARATUS FOR PACKETIZED CONTENT DELIVERY OVER A CONTENT DELIVERY NETWORK", which is now published as U.S. Patent Application Publication No. 2011/0103374 of the same title filed on Apr. 21, 2010, and issued as U.S. Pat. No. 10,264,029 on Apr. 16, 2019, each of which is incorporated herein by reference in its entirety. Such a network provides, inter alia, significant enhancements in terms of common control of different services, implementation and management of content delivery sessions according to unicast or multicast models, etc.; however, it is appreciated that the various features of the present disclosure are in no way limited to this or any of the foregoing referenced architectures.

Exemplary Backbone Network—

Figure 2:
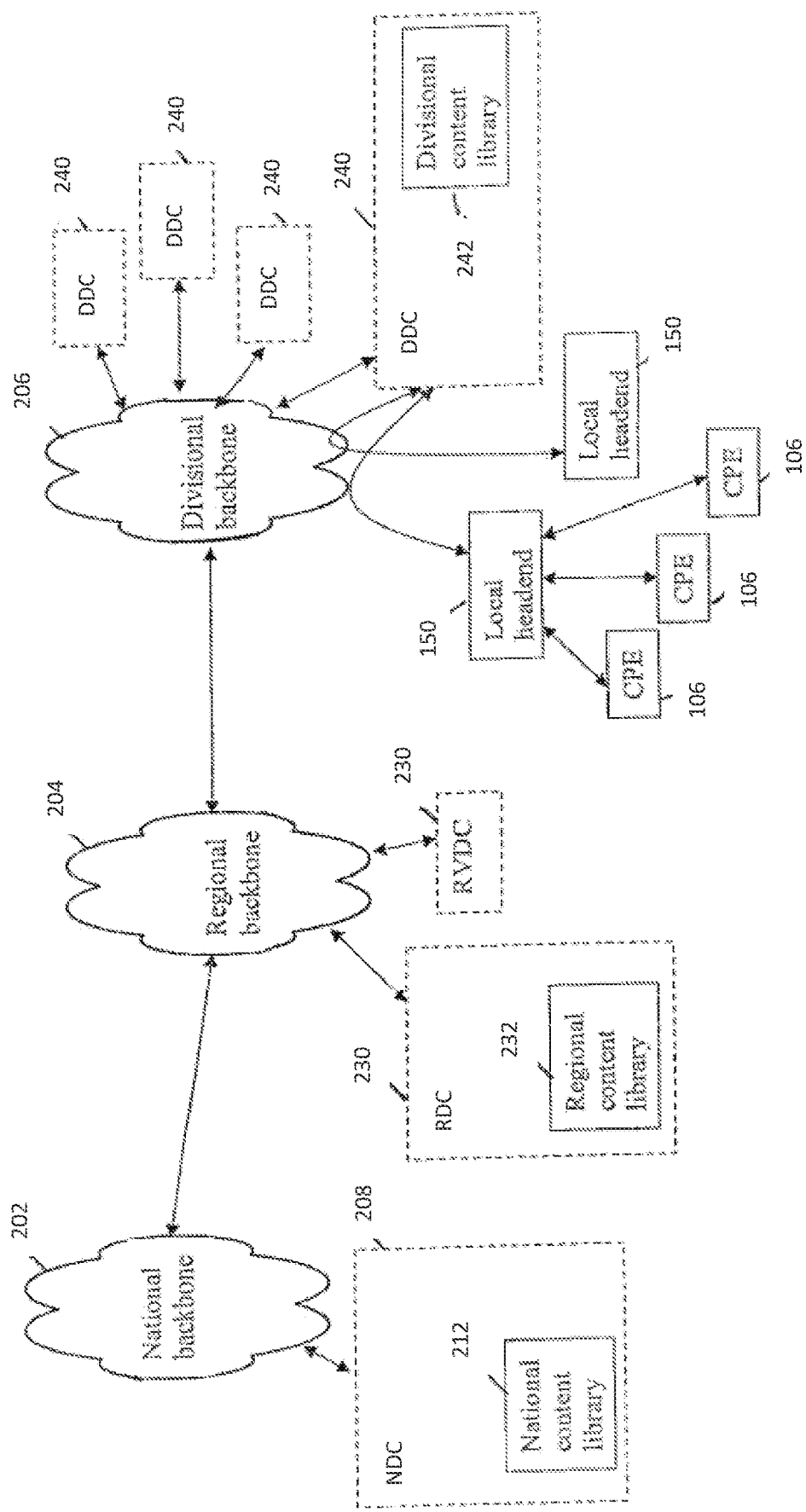
FIG. 2 is a functional block diagram illustrating one exemplary "backbone" network architecture for providing Internet services and access to users of a managed content distribution network such as those of FIGS. 1-1d.

While the foregoing service provider network 100 described herein can (and in fact does) carry packetized content (e.g., IP over MPEG for high-speed data or Internet TV, MPEG2 packet content over QAM for MPTS, etc.), service provider networks are primarily designed for local delivery of data content. Referring now to FIG. 2, a high-level representation of one embodiment of a national-level network architecture useful with the present disclosure is illustrated and described. As shown, the national network 200 generally comprises a national "backbone" network component 202, a regional backbone network component 204, and a divisional backbone network component 206, in data communication with one another. As used herein, the term "backbone" refers generally and without limitation to a connective link or component of a network which links other networks together (typically with higher data carrying capacity than the individual networks in aggregate), although other configurations may be used with equal success.

The national backbone component 202 includes a national data center (NDC) 208. Although FIG. 2 illustrates only a single NDC 208 for simplicity of illustration, it is appreciated that several such NDCs may be utilized in conjunction with the present disclosure. Furthermore, in one embodiment, the national backbone 202 may be configured to include at least two NDCs 208, each having the capability to provide failover and redundancy services. In this way, national services are not affected if one of the NDCs 208 experiences a total or partial failure (e.g., to catastrophic natural disaster, act of war or terrorism, power failure, etc.). The NDC 208 may further include, inter alia, a national content library 212.

The regional backbone component 204 of FIG. 2 comprises a plurality of regional data centers (RDCs) 230. There are at least two RDC 230 connected to the backbone in the illustrated embodiment, although any number may be used. A regional content library 232 is associated with each RDC 230.

The illustrated divisional backbone component 206 comprises a plurality of divisional data centers (DDCs) 240. The DDCs 240 are each associated with one or more local headends 150 which are utilized for providing content to a plurality of consumer users via, e.g., premises equipment (CPE) 106.

It is via the national 202, regional 204, and divisional backbones 206 that the NDCs 208, RDCs 230, and DDCs 240 are connected together. Static/semi-static content (e.g., pre-programmed content, cached data, etc.) may be acquired at the NDC, and stored at the national content library 212. From the national library 212, the content may be pushed or pulled to one or more of the regional libraries 232 of the RDCs 230, and/or the divisional libraries 242 of the DDCs 242. It is further appreciated that content may be acquired at the regional network 204 (and/or divisional network 206) for push or pull therefrom as well. Additionally, dynamic content (e.g., live data, streaming data, etc.) may similarly traverse the backbone infrastructure for delivery from division to division, region to region, etc.

As a brief aside, existing service provider networks route Internet Protocol (IP) data for last-mile delivery. Such IP routing is hop-based. Specifically, each packet is relayed through intermediary nodes (e.g., bridges, routers and gateways) from the source node to the destination node. As used herein, a "hop" refers generally to the links between each of the nodes; a "path" is the aggregated list of hops that the packet traverses from source to destination. For typical hop-based routing schemes, whenever a node receives a packet it determines: (i) whether to route the packet to another node (e.g., is the packet addressed to another node, redundant, corrupted, etc.); and (ii) which node to route to (i.e., the next hop). Any given node is only responsible for determining the next hop along the path, not the complete path to a destination. The next hops listed in a routing table are on networks to which the node is directly connected to.

In contrast to the service provider networks, backbone networks use routing protocols such as those that provide path-based routing. Path-based routing may also be referred to as source-based routing; in source-based routing, the source of the data packet determines the path that the packet will traverse, thereby reducing the computation requirements on intermediary nodes (e.g., complex lookups in a routing table). One exemplary path-based routing technology is Multiprotocol Label Switching (MPLS). MPLS directs data from one node to the next node based on short path labels rather than network addresses. The labels identify virtual links (paths) between distant nodes rather than endpoint addresses. A path begins at a label edge router (LER) or "ingress router", which makes a decision on which label to prefix to a packet based on the appropriate forwarding equivalence class (FEC). The last router in an LSP is referred to as an "egress router". Routers in-between the ingress and egress routers are herein referred to as "transit routers" or "label switch routers (LSRs)". Each router forwards the packet along to the next router, which forwards it to the next router, etc. The penultimate router (second to last router in the path) removes the outermost label and the last router in the path (i.e., the egress router in this example) removes the inner label from the packet and forwards the resulting frame based on an appropriate higher-layer (e.g., network) protocol, such as for example, a TCP/IP network protocol. Since the Label Switched Path (LSP) transactions are performed at the Data Link Layer (Layer 2) and are transparent to networking protocols (Layer 3), an LSP is also sometimes referred to as an MPLS tunnel and/or "pseudo-wire".

As used herein, "Layer 1" (or the "Physical" Layer or PHY) refers without limitation to the hardware transmission technology of the network.

"Layer 2" (or the "Data Link" Layer) refers without limitation to a protocol layer that transfers data between adjacent network nodes in a wide area network or between nodes on the same local area network segment. Layer 2 functions include among other things, media access control (MAC addressing), flow control and error checking.

"Layer 3" (or the "Network" Layer) refers to a protocol layer that routes data throughout the network based on network address resolution, etc. Layer 3 functions include among other things: route determination, and packet forwarding, etc.

"Layer 4" (or the "Transport" Layer) refers to a protocol layer that provides for the transfer of data for users, systems, and applications, and reliable data transfer services to the upper levels. Examples of transport protocols are the transport control protocol (TCP) and the user datagram protocol (UDP). Transport Layer protocols are typically either connection oriented (such as TCP) or non-connection oriented (such as UDP).

Method—

Figure 3:
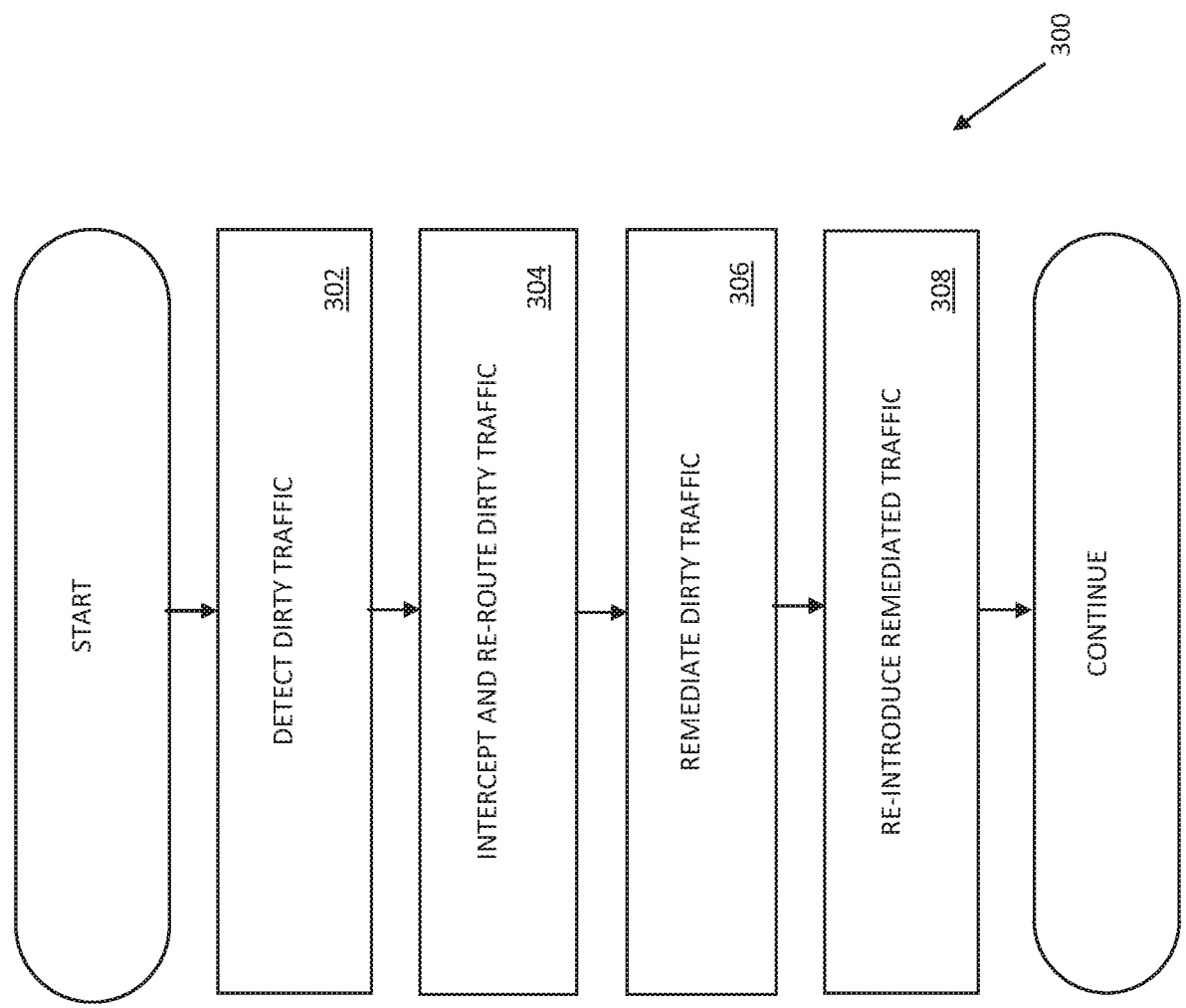
FIG. 3 is a logical flow diagram illustrating one exemplary generalized method for processing packet data according to the disclosure.

FIG. 3 illustrates one embodiment of a generalized method for mitigating a malicious attack via the techniques described herein, including dynamically triggered re-routing.

At step 302 of the method 300, dirty traffic from an off-network source is detected. As used herein, the term "traffic" refers generally and without limitation to a plurality of data streams that are serviced by a network. Generally, network traffic includes both data that is delivered to the respective endpoints of the network, as well as network overhead and control data that is used to efficiently manage network operation (e.g., authentication data, authorization data, billing data, flow control, congestion notifications, etc.)

As used herein, the term "dirty" refers generally and without limitation to network traffic, at least a portion of which, includes routing information that in aggregate could result in deleterious effects on one or more hosts. Typically, dirty traffic is a combination of legitimate traffic and attack traffic destined for a given host(s) or network(s). Cleaning the traffic uses one or more heuristics to identify the attack traffic, and separate it from the legitimate traffic so that the attack traffic can be dropped, and the legitimate traffic can be delivered to its originally intended destination. Common examples of malicious network attacks which can result in dirty traffic include Denial of Service (DoS) and Distributed Denial of Service (DDoS) attacks. More generally, artisans of ordinary skill in the related arts, given the contents of the present disclosure, will readily appreciate that the various principles described herein may be readily adapted to the mitigation of any undesirable routing of network traffic to a small set of destination addresses.

As used herein, the term "clean", "cleaned", and "scrubbed" refers generally and without limitation to network traffic which has been remediated in some fashion, such that it is determined to be legitimate. The mitigation of such attacks may be handled by e.g., filtering out data that is malicious, quarantining data of unknown origin, and/or temporarily storing/re-distributing/re-routing of legitimate traffic in a manner so as to prevent network strain. The present disclosure also contemplates more invasive types of remediation, including e.g., removing malicious or undesired data from within one or more packets, inspection of packets to ensure acceptable contents, etc. Yet other schemes for scrubbing network traffic will be readily appreciated by those of ordinary skill, given the contents of the present disclosure.

In one exemplary embodiment, a malicious network attack is detected by existing network equipment, such as by routers or other devices within the network equipped with software processes configured to evaluate data patterns, congestion, outages, and/or other metrics of interest associated with e.g., DDoS attacks. In other variants, malicious network attack detection may be flagged based on customer or $3^{rd}$ party input (e.g., the service provider may receive notification of a network condition or outage via customer service calls, trouble signals or message issued from customer equipment, etc.). In still other variants, malicious attack detection may be triggered by communications with other network providers (e.g., another MSO or backbone provider, a wireless service provider, etc.). Legacy detection schemes are primarily based on analysis performed at the edge network and/or service provider data centers; it is recognized by the inventors hereof that future detection schemes may incorporate detection appliances installed in front of service provider data centers or other key points of the network.

As a brief aside, existing schemes for malicious network activity detection typically consider a number of factors in order to distinguish between legitimate content and illegitimate content. Common indicators of malicious network activity include, without limitation: (i) aggregate characteristics of traffic, (ii) characteristics of a plurality of traffic originating from multiple sources, (iii) historic traffic behaviors, and/or (iv) anomalous traffic content. For example, a DDoS attack may be identified when a large number of similar service requests directed to the same target address but originating from multiple network addresses, all occur within a certain temporal proximity. More generally, artisans of ordinary skill in the related arts will readily appreciate that any rule-based scheme for identifying a malicious attack may be substituted herein with equal success. For example, network processing technologies that enable filtering packets based on e.g., source address, destination address, payload, packet types, packet size, etc. and combinations thereof are readily available in the current market (circa 2015).

Referring back to step 302 of FIG. 3, in one embodiment of the present disclosure, the off-network source is connected to the network via an ingress node. In one exemplary variant, the off-network source is connected to a peering router that handles both ingress and egress of the off-network source to the network, and vice versa.

As used herein, the term "off-network" refers generally and without limitation to sources of traffic that are outside the network. Common examples of off-network sources include e.g., other networks (both edge networks and other backbone networks), content sources, network gateways, etc. As used herein, "ingress node" refers generally and without limitation to a network node that receives traffic from one or more off-network sources (e.g., the Internet or other external unmanaged or managed networks) for distribution via the MSO's backbone network. As used herein, the term "egress node" refers generally and without limitation to a network node that transmits traffic to one or more off-network sources for further distribution, such as to an MSO HFC network.

In one variant, the ingress node is configured to encapsulate a first protocol received from the off-network, for delivery on the network via a second protocol. In one exemplary implementation, the ingress node receives network traffic that is formatted according to a packet-switched format and encapsulates it within a label-switched format. For example, the ingress node may receive data packets according to Transmission Control Protocol/Internet Protocol (TCP/IP) and/or User Datagram Protocol/Internet Protocol (UDP/IP), and encapsulate them within Multiprotocol Label Switching (MPLS) data packets. Those of ordinary skill in the related arts will readily appreciate that other so-called "tunneling" techniques may be used with equal success. As used herein, the term "tunneling" refers generally and without limitation to the practice of transporting data of a first protocol via an underlying "tunneling" network protocol. One important use of a tunneling protocol is to enable different networking capabilities over different networks e.g., high speed routing via backbone networks versus fine address resolution via edge networks, etc.

In other variants, the ingress node is configured to perform protocol translation (contrast: encapsulation as above) of the first protocol to a second protocol. In one exemplary implementation, the ingress node receives network traffic that is formatted according to a packet-switched format, unpacks the packet-switched format, and re-packetizes the payload within a label-switched format. Re-packetizing may include one or more of e.g., network address translation, label insertion, decoding and/or encoding data with e.g., transmission line codes, error checking, error correction, cyclic redundancy checks (CRCs), optical-electrical and/or electrical-optical conversion, rate conversion (e.g., throttling up/down data rates, etc.), quality of service adjustment, serialization and/or de-serialization, etc.

Common examples of network nodes that may implement various protocol translation and/or encapsulation include without limitation, network gateways, firewalls, switches, routers, bridges, etc. Various other network appliances may be readily substituted by those of ordinary skill, given the contents of the present disclosure.

At step 304 of the method 300, the dirty traffic is re-routed to a scrubbing appliance. In one embodiment, the network is a path-routed network and re-routing dirty traffic is performed with a label switched path. As previously noted, in computer networking, path routing (also called "path addressing" and "source routing") allows a sender of a packet to partially or completely specify the route the packet takes through the network. In contrast, in hop-routing protocols, intermediary nodes (such as routers) in the network determine the path based on the packet's destination.

While the disclosed embodiments are primarily discussed with reference to a path-routed network, the disclosed methods may be readily implemented in any network technology which expressly handles or mitigates looping and/or inherently prevents looping. "Looping" refers to the circumstance under which a node forwards a packet which it has previously forwarded; generally, a loop structure is a degenerate condition that occurs whenever a node's downstream path also connects to the node's upstream path. Looping is undesirable for most networking technologies (some ring networks require loop functionality for operation), and it is appreciated that certain technologies have less stringent protections against loops that may be inadvertently (or maliciously) circumvented. Common examples of such networks include e.g., host/slave network topologies where the slave transactions are controlled by the host, circuit-switched networks where the circuit is a fixed path, unidirectional networks, ring networks, etc.

In one exemplary embodiment, re-routing may be performed using existing legacy equipment based on sinkhole route injection (similar to Remotely Triggered Black Hole (RTBH) service). In order to re-direct traffic to the scrubbing appliance (or complex of appliances), the peering router (or other ingress node) of the network communicates with a dedicated external Border Gateway Protocol (eBGP) interface of the scrubbing appliance (or complex). As a brief aside, Border Gateway Protocol (BGP) is a standardized gateway protocol designed to exchange routing and reachability information between distinct networks with consistent routing policies (a network with a consistent routing policy is also referred to as an Autonomous System (AS)). BGP makes routing decisions based on paths, network policies, or rule-sets configured by a network administrator, in particular, for core routing decisions. BGP may also be used for routing external to a network (eBGP), or within a network (Interior Border Gateway Protocol (iBGP)).

In the aforementioned scheme, the eBGP session between the peering router and the ingress scrubbing router uses a private AS Number (ASN) that is not part of the broader backbone network, thereby allowing the peering router to address the scrubbing complex as an isolated network distinct from the backbone network. The eBGP session is configured such that the peering routers will not announce any routes via this session toward the scrubbing complex, and any routes the peering routers receive from the scrubbing complex will be limited to the correct community (i.e., only the scrubbing complex). More directly, the scrubbing appliance route injection is only visible to the peering routers, and invisible to the rest of the backbone network. In some conservative implementations, other safeguards may be additionally deployed to ensure that routes received from the private ASN are discarded by the rest of the network.

It will be recognized that in exemplary implementations, the aforementioned "injected" route (known only to the peering routers) is to be distinguished from (i) its "next-hop", another IP address, the route to which is known by the core, and that links to a specific label known to the core as destined for the scrubbing router), and from (ii) the "normal" route, which is known to the entire network with a next-hop that sends it to the original destination.

During normal operation, the peering router has a global routing table of next-hop information for normal traffic resolution. Additionally, the scrubbing router updates the peering router with the next-hop information for the scrubbing appliance for use when dirty traffic is identified. In some cases, the scrubbing router may provide multiple next-hop information that is used to route to multiple scrubbing appliances. In other embodiments, the scrubbing router may only provide next-hop information on a periodic basis, an as-needed basis, or according to a load balancing considerations of the scrubbing appliances, etc. Various other considerations may be substituted with equivalent efficacy, by those of ordinary skill, given the contents of the present disclosure.

When dirty traffic is received on the peering routers from an off-network source that is destined for one of the addresses or prefixes being sink-holed for scrubbing (i.e., a server address that is being attacked), the peering router will impose a label that re-directs the next-hop to the scrubbing complex, and then traffic will be label-switched to that destination. Notably, even though the rest of the backbone network will not recognize the modified path in the global routing table, the peering router can directly route the traffic to the scrubbing complex by imposing the correct MPLS label (i.e. the one associated with the scrubbing complex router(s)) on the packets.

In one such implementation, the traffic flow between the peering router and the scrubbing complex can be managed via an anycast next-hop, where the best route to the next-hop will be determined via Interior Gateway Protocol (IGP). Thereafter, the proper label can be substituted. Alternatively, the traffic flow can be re-directed via manual configuration based on which routes are announced (thereby selecting one scrubbing complex from a plurality of scrubbing complexes). Still other implementations may combine features of both anycast and manual selection. Since malicious attacks are unpredictable, enabling flexibility in re-directing traffic to various scrubbing complexes may be important so as to balance the traffic influx across the available capacity in the scrubbing complexes.

At step 306 of the method 300, the scrubbing appliance (or complex of appliances) inspects and cleans the dirty traffic. As previously alluded to, dirty traffic can include both desired and undesired traffic (e.g., legitimate service transactions and illegitimate service, etc.). Redirecting the traffic does not automatically block the malicious attack, however once the traffic is redirected, the scrubbing appliance can characterize the malicious attack, and/or remove the malicious traffic from the legitimate traffic. In some cases, it may be determined that there is no DDoS attack and that the spike in traffic is normal e.g., the result of a flash crowd (or otherwise not malicious).

In one embodiment, the scrubbing appliance performs one or more types of filtering, diverting, quarantining, and/or deleting malicious traffic. As a brief aside, one of the hardest parts of mitigating DDoS attacks is identifying the specific characteristics of the DDoS traffic so that it can be differentiated from legitimate traffic. Scrubbing appliances should be able to identify common attack methods automatically (e.g., based on pattern recognition), and in more sophisticated variants, provide tools for a network administrator to customize identification (e.g., such as tcpdump, traceroute, etc.) For example, so-called "application layer" DDoS cannot be detected based solely on traffic characteristics e.g., contents of the packet or its payload. In these cases, the requests may be legitimate for a webpage but the volume of requests from a single user or group of users characterize it as a DDoS attack. In such cases, the scrubbing appliance may be required to detect abusive or unusual behavior from individual IP's to determine if they are malicious, etc.

Similarly, some DDoS attacks are performed by relatively unsophisticated malware and attempt to "flood" the network to overwhelm lower layer operations. To accommodate the full spectrum of attack possibilities, various embodiments of the present disclosure employ both prebuilt and custom mitigation templates available to defend against flood-based and application-based DDoS attacks.

In one embodiment, metrics are calculated from scrubbing operations. These metrics may be useful to identify the amount of capacity for future planning, as well as to anticipate attacks. Common examples of such metrics may include e.g., (i) degree of contamination (e.g., what percentage of traffic is malicious), (ii) amount of traffic, (iii) amount of malicious traffic, (iv) scrubbing time, and (v) indeterminate traffic. Still other characteristics may be determined that assist in identifying attack traffic and/or attack origination; common examples of such characteristics may include, without limitation: malicious traffic patterns, malicious addresses, and/or any number of features that may be found common to a malicious attack.

In some variants of the present disclosure, metrics and or other information may be disseminated to other network entities and/or off-network entities to assist in other traffic mitigation schemes. For example, edge networks, and other peer entity networks may be appraised of malicious attacks that have affected various ones of their subscribers, etc. Such information can be useful to rapidly quell an incipient attack on multiple networking fronts.

Referring back to step 306 of FIG. 3, in one exemplary embodiment, the scrubbing complex includes multiple scrubbing appliances. In some variants, the scrubbing appliances may have different levels of capability; for example, as newer equipment with more advanced technologies is acquired, older equipment may still be used on a lesser scale. In other variants, the scrubbing appliances may all have equivalent levels of capability, or alternately be interchangeably used without regard to capabilities. In some cases, the multiple scrubbing appliances are allocated to malicious attacks based on national, regional, divisional, and/or other geographic scheme (e.g., eastern, western). In one such implementation, a larger regional population may be supported by more capable equipment (e.g., a large metropolitan area may have a dedicated scrubbing appliance, etc.). In other cases, the multiple scrubbing appliances are allocated traffic according to a load balancing scheme. In still other cases, the multiple scrubbing appliances are allocated traffic according to a prioritization scheme; highest priority traffic may be routed to the most capable scrubbing appliance, etc.

In some variants, the scrubbing complex further includes an internal gateway and/or routing infrastructure for re-distributing dirty traffic amongst the scrubbing appliances. As previously alluded to, the scrubbing gateway may use an ingress scrubbing router for the scrubbing appliance (or complex of appliances). The ingress scrubbing router can provide a dedicated external Border Gateway Protocol (eBGP) interface to the peering router (or other ingress node) of the network. By presenting an eBGP routing interface, the scrubbing complex can internally manage its scrubbing appliances according to a variety of allocation methods (e.g., first-in-first-out (FIFO), load balancing, priority, etc.) without exposing its machinations to the rest of the network. More directly, the peering routers need only (label) switch traffic to the relatively fixed path of the scrubbing complex.

More generally, artisans of ordinary skill in the related arts, given the contents of the present disclosure, will readily appreciate that any number of networking re-direction/switching techniques may require that the scrubbing complex update appropriate switching information to the ingress router(s). In fact, as will be appreciated, the scrubbing complex routing information may be disseminated to all the ingress path-routing nodes via existing network control overhead schemes such as e.g., automatic network updates, out-of-band schemes (e.g., manual updates), push delivery, pull delivery, periodic updates, etc. Such switching information may identify the ingress scrubbing router, another ingress scrubbing router (e.g., where the scrubbing router may be too heavily loaded and redirects, etc.), and/or a particular scrubbing appliance.

At step 308 of the method 300, the cleaned traffic is returned to the network. In one embodiment, the scrubbing appliance transmits the cleaned traffic to the next hop in the path listing thereby returning it to the network. More directly, the scrubbing appliance can re-introduce the cleaned traffic to the network without introducing a loop because the original path information remains intact (presumably, the original ingress node did not construct the original path with a loop). In one embodiment, the next path router will select the best path in the global routing table and forward the packet on to its destination. It will be appreciated, however that the return traffic can be, in various implementations, path-routed or hop-routed, or routed using yet other techniques.

In one embodiment, the interconnect between the clean side of the scrubbing complex and the backbone network comprises a very simple BGP session that announces a default address for the scrubbing complex, or a static default route. The original source of the traffic is preserved by the cleaning process, so the scrubbing complex does not announce any routes from the clean side of the scrubbing complex toward the network. More directly, the other network entities will be unaware that the scrubbing appliance (or complex) was inserted in the path. Artisans of ordinary skill in the related arts will readily appreciate that the aforementioned solution may affect certain network functions and/or safeguards. For example, unicast Reverse Path Forwarding (uRPF) is a security feature that prevents spoofing attacks by checking that an IP packet has a matching entry in the routing table for the source IP address. Since the scrubbing complex has a network address outside the path of the packet, the packet may be incorrectly flagged as a spoofing attack. Accordingly in one variant, such safeguards of the network are disabled. In other variants, it may be possible for such network safeguards to ignore spoofing from certain addresses (i.e., from the scrubbing complex). Still other solutions will be readily appreciated by those of ordinary skill in the related arts, given the contents of the present disclosure.

In alternative embodiments, the scrubbing appliance may directly tunnel the cleaned data to the destination node. Direct tunneling solutions may be particularly useful where other nodes of the network should be informed of the IP address under attack. For example, directly tunneled embodiments enable the entire backbone network to scrub malicious traffic sourced from both network and off-network sources. However, as previously noted, the additional time and expense necessary to construct a tunnel between the scrubbing appliance and the destination node is significantly more expensive; consequently, directly tunneled solutions may primarily be limited to targets of commercial value (e.g., data centers or long lived DDoS attacks).

Various other schemes for mitigating network attacks by dynamically re-routing network traffic will be readily appreciated by those of ordinary skill in the related arts, given the contents of the present disclosure.

Figure 3A:
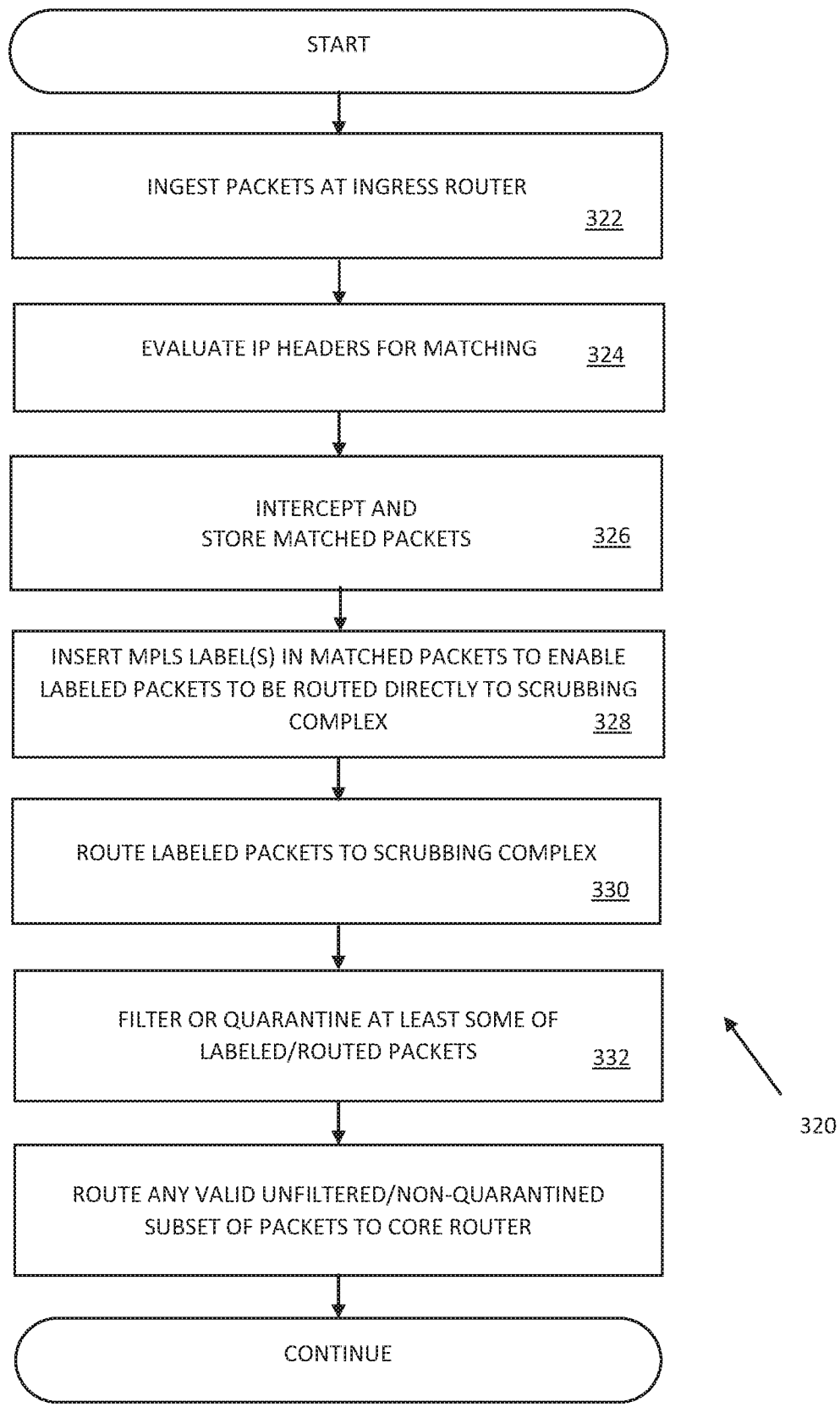
FIG. 3a is a logical flow diagram illustrating one particular implementation of the generalized method for processing packet data of FIG. 3.

FIG. 3a shows one exemplary implementation 320 of the method 300 of FIG. 3. As shown, the method 320 of FIG. 3a first ingests packets at the ingress router (step 322).

Next, per step 324, the ingested packets are evaluated. Specifically, in the exemplary embodiment, the packet IP headers are examined in order to enable matching to pre-programmed routing data, so as to determine at least one of an exit interface or path from the router, so as to enable subsequent processing (e.g., MPLS label insertion). Per step 326, the identified packets are intercepted and stored (such as in a packet queue 803; see FIG. 8).

Per step 328, the MPLS or other routing-layer label is inserted in the "matched" packets, whether via encapsulation or protocol translation.

The inserted labels are then used to route the labeled packets to the scrubbing complex (step 330).

At the scrubbing complex, the "scrubbing" is applied, such as via filtering or quarantining the identified, labeled packets (step 332).

Per step 334, any remediated packets (which may include some of those quarantined or otherwise "scrubbed" or identified to be clean) are routed back to a core router for further distribution to the destination address specified in the network layer of the packets.

Example Operation, Attack Mitigation—

Figure 4:
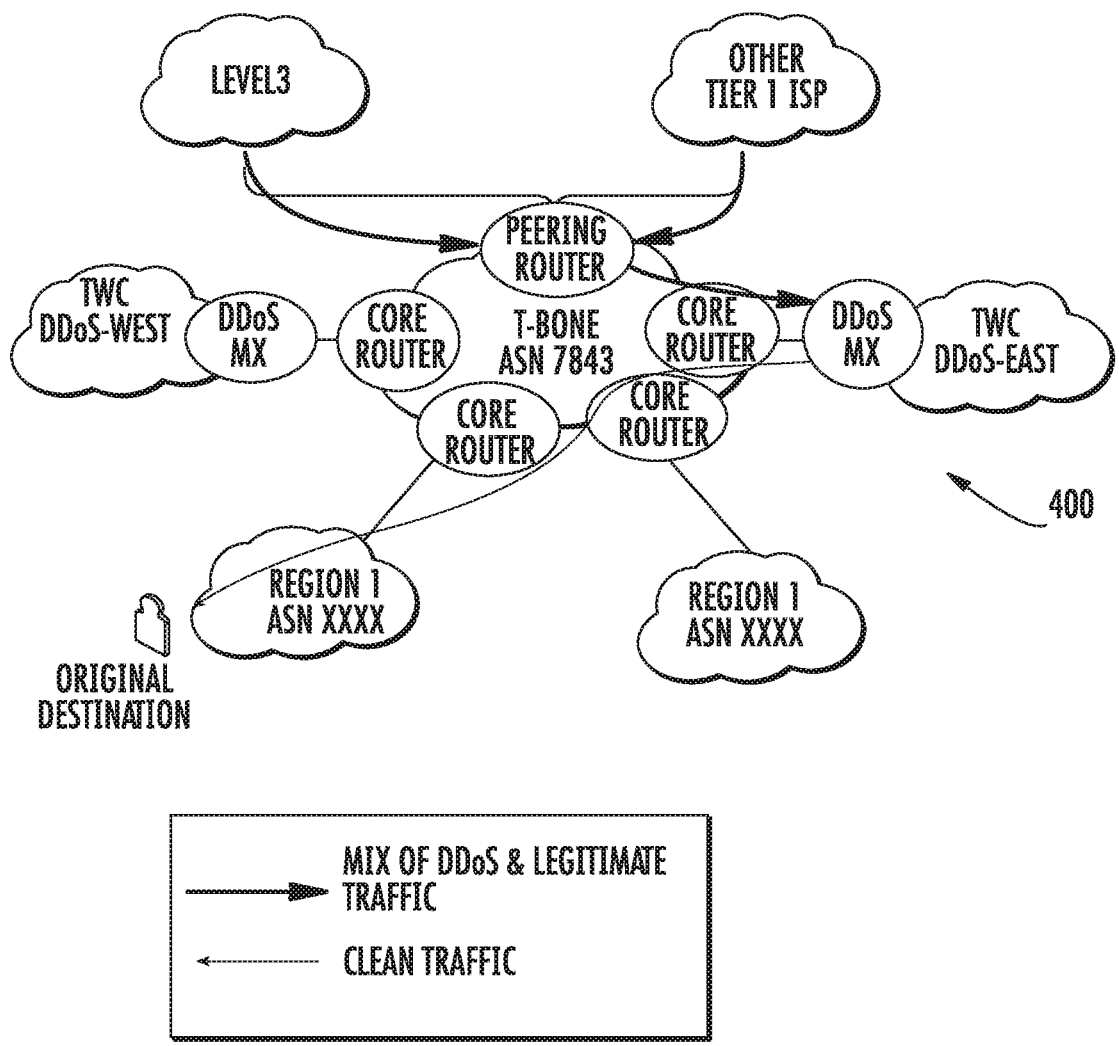
FIG. 4 is a logical block diagram of one embodiment of an MSO backbone showing general routing and flow of "dirty" traffic before and after remediation, according to the present disclosure.
Figure 4A:
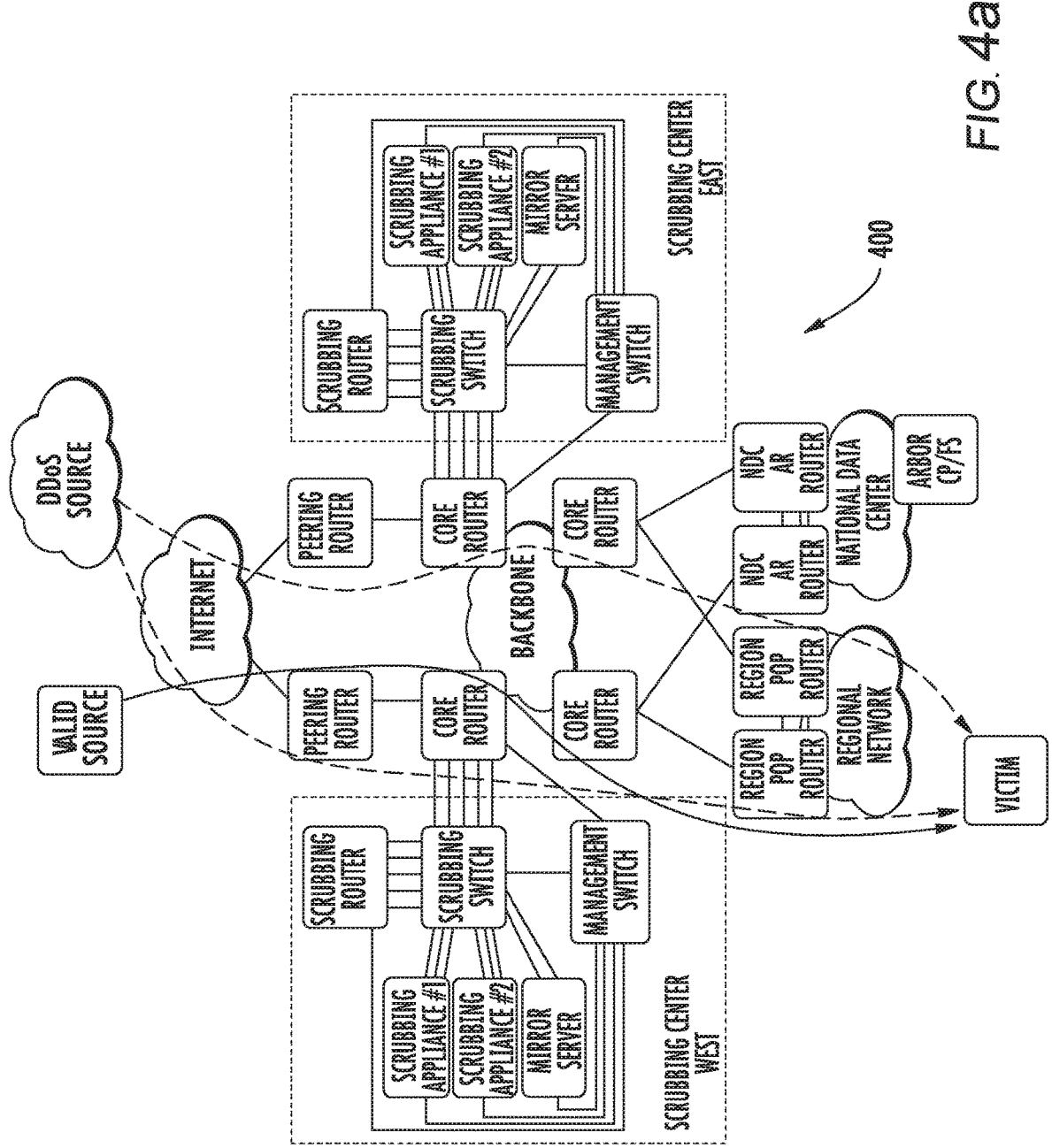
FIG. 4a is a logical block diagram of one embodiment of an MSO backbone showing general routing and flow of "dirty" traffic before at inception of a DDoS attack, according to the present disclosure.

FIGS. 4 and 4a are graphical representations of one exemplary backbone network 400 experiencing a DDoS attack. As shown in FIG. 4a, the backbone network includes a number of core routers that are coupled to scrubbing complexes (as shown, Scrubbing Center West, and Scrubbing Center East). Peering routers (ingress nodes) to the backbone network interface with other off-network networks (e.g., other backbone network providers, etc.). The core routers are also coupled to a regional network and a national data center. As shown, the DDoS attack starts at one or more sources that are located off-network, and is routed via the peering routers onto the backbone network, where it is handled by the core routers and distributed to the victim. Valid data takes a similar path, but is indistinguishable by the routers in the network from the DDoS traffic.

Figure 4B:
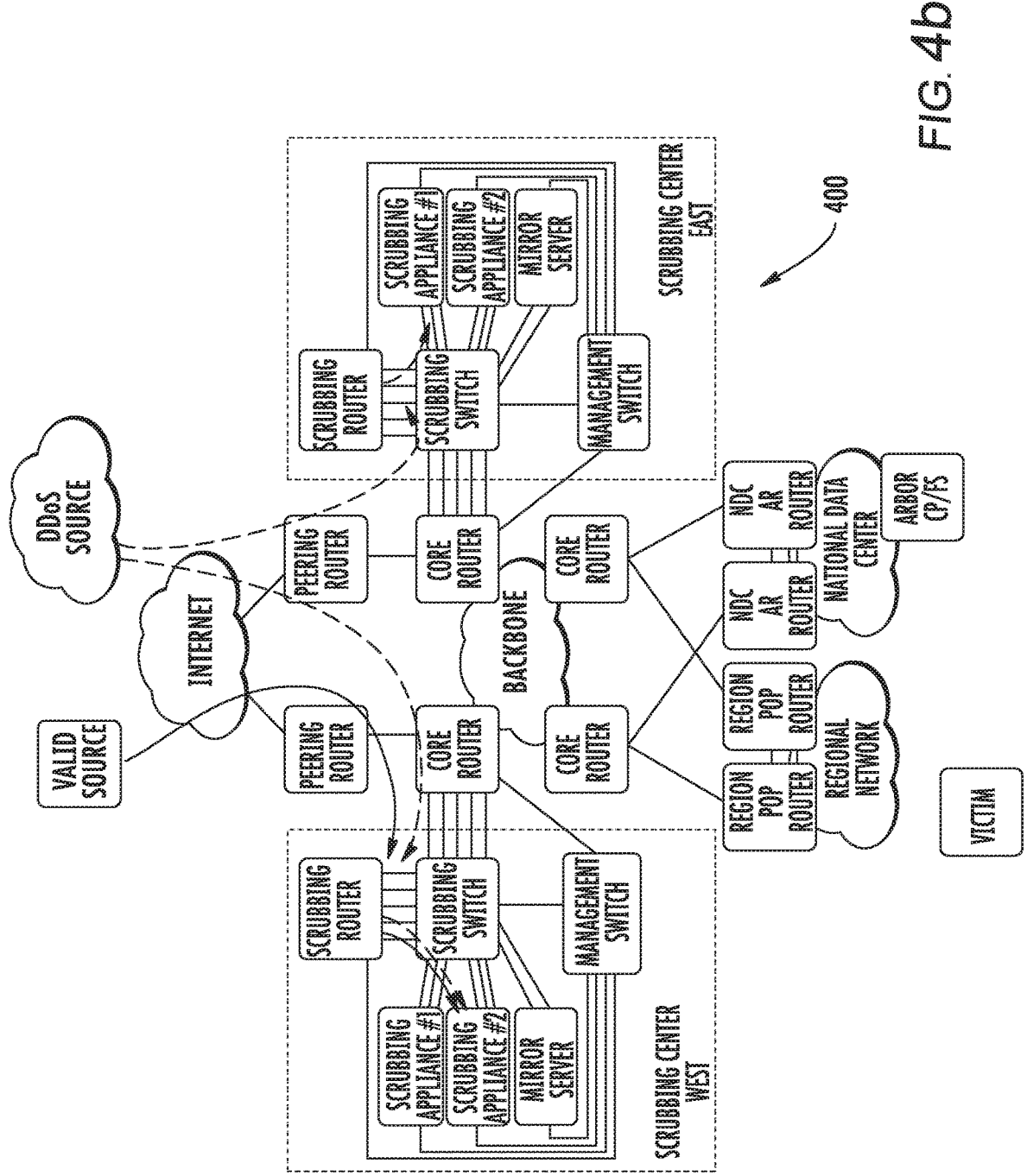

FIG. 4b is a graphical representation of the ingress peering router redirecting the dirty traffic from the DDoS attack of FIG. 4a to an ingress scrubbing router, thereafter the ingress scrubbing router assigns a scrubbing appliance from a network of scrubbing appliances to scrub the dirty traffic. The peering routers receive data packets according to Internet Protocol (IP) data and encapsulates them within Multiprotocol Label Switching (MPLS) data packets. As shown, any traffic that is addressed to the victim's IP address is re-directed to the scrubbing router via insertion of the scrubbing router into the path. The scrubbing router assigns the dirty traffic to a particular scrubbing appliance via the scrubbing switch.

Figure 4C:
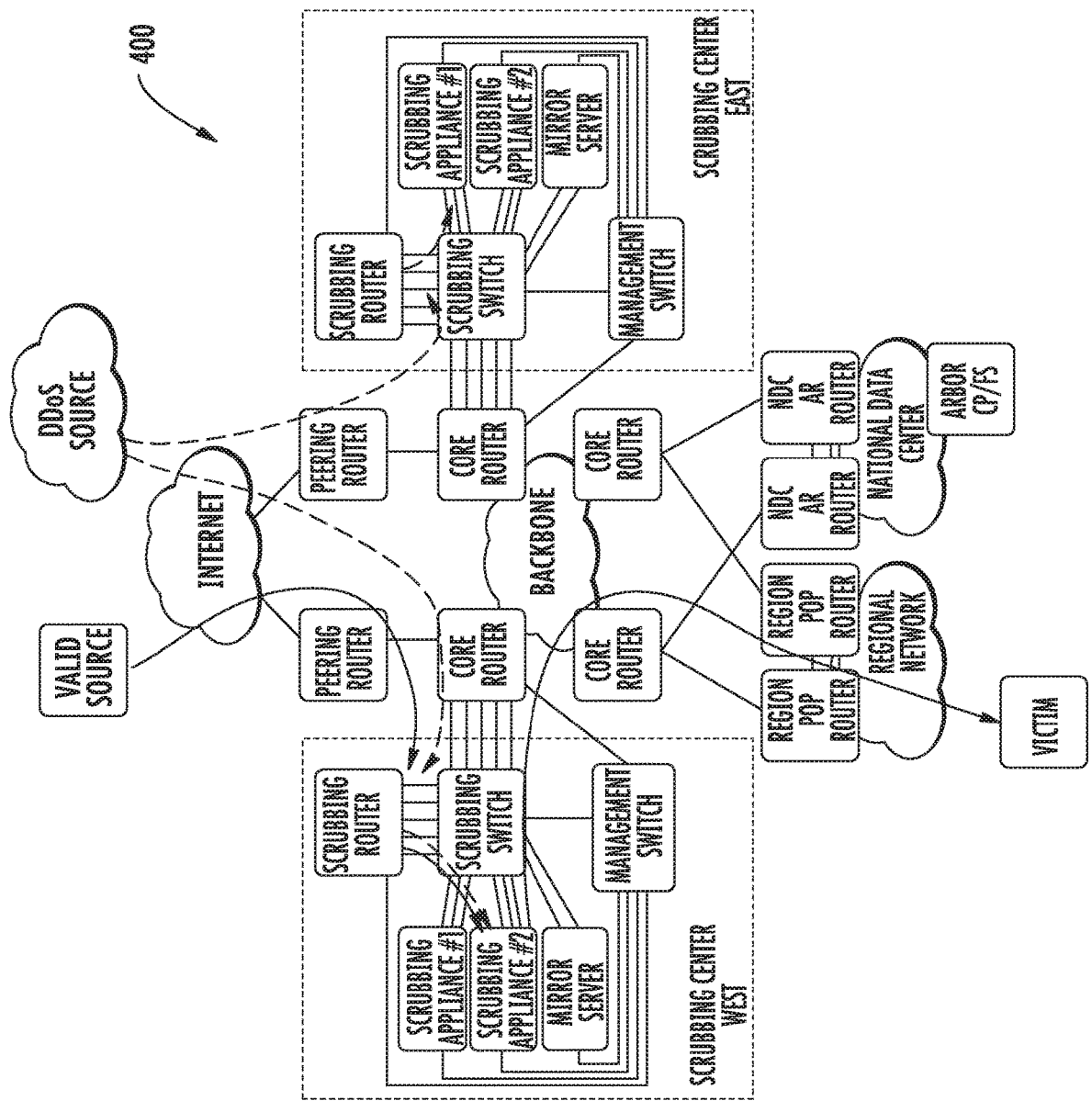
FIG. 4c is a logical block diagram of the MSO backbone of FIGS. 4-4a, showing the scrubbing appliance returning the cleaned traffic back to the network for routing to the original destination.

FIG. 4c is a graphical representation of the scrubbing appliance returning the cleaned traffic back to the network for routing to the original destination (i.e., the victim of the DDoS attack). As shown, once the traffic has been cleaned, the traffic can be transmitted back onto the core network (via the scrubbing switch).

Figure 4D:
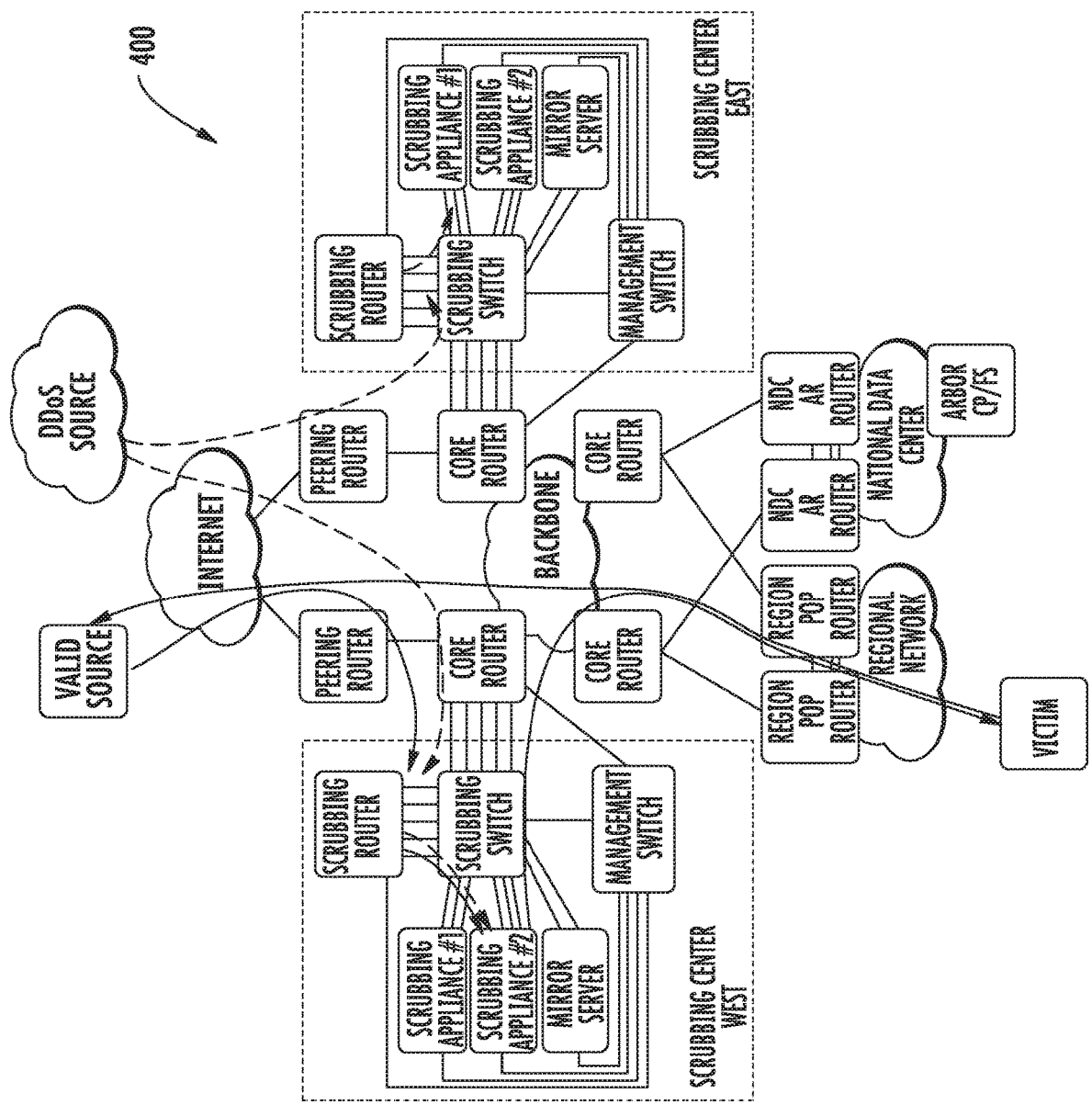
FIG. 4d is a logical block diagram of the MSO backbone of FIGS. 4-4a, showing the return of traffic from the "victim" to the valid data source.

FIG. 4d is a graphical representation of the return traffic from the victim to the valid source. Since the scrubbing insertion occurs transparently to both the victim, the valid source, and the core network routers (only the peering router is aware of the scrubbing appliance insertion), the return traffic can be routed normally.

Figure 5:
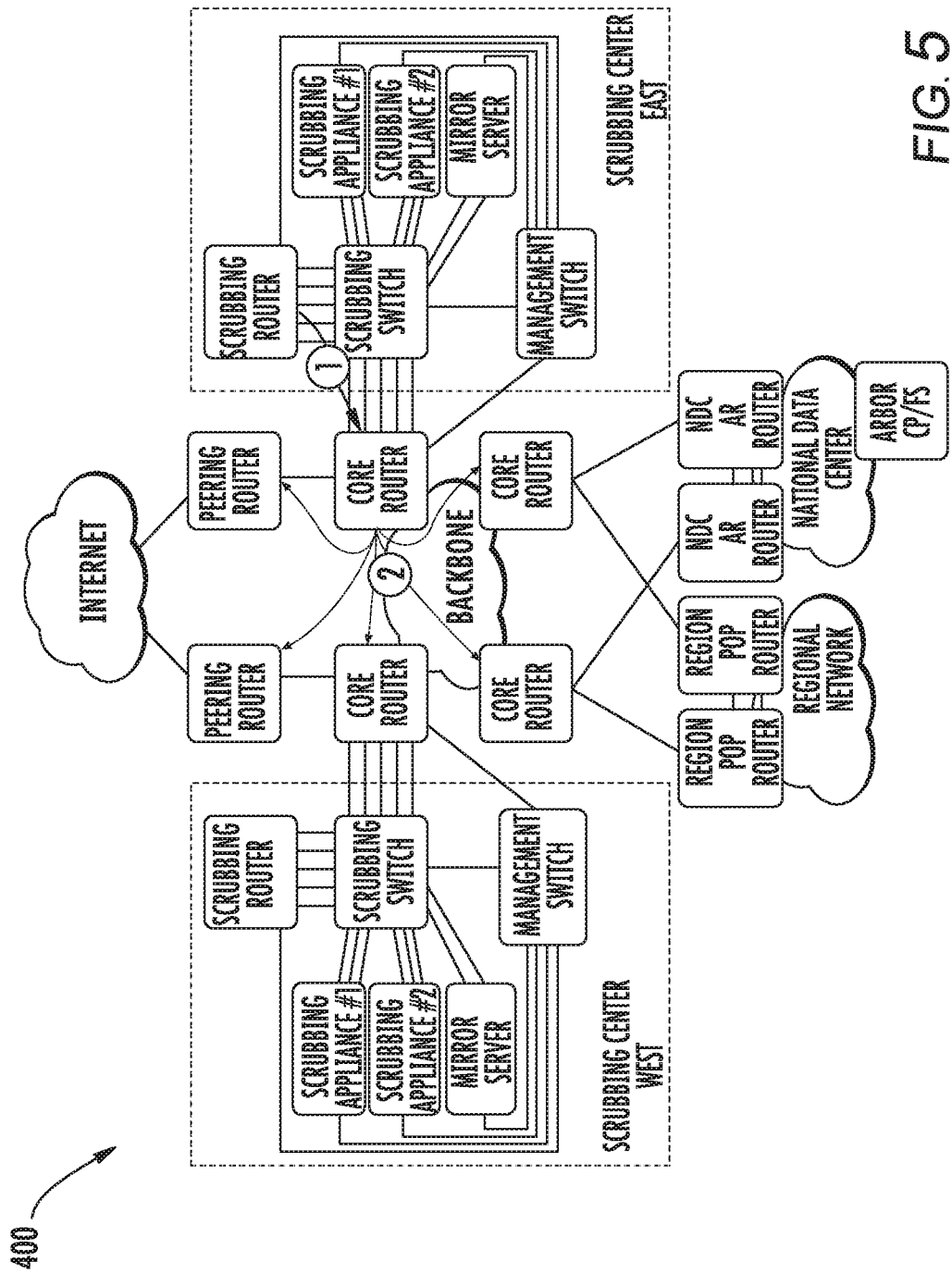
FIG. 5 is a logical block diagram of one embodiment of an MSO backbone and scrubbing complex wherein the scrubbing complex advertises its presence to one or more backbone routers.

FIG. 5 illustrates a graphical representation of the scrubbing router notifying (advertising) its presence to the core routers of the backbone network 400. As shown, the scrubber disseminates an anycast next-hop IP address to the core routers via an eBGP transaction and label peering (step 1). The core routers forward the transaction to the peering routers (via e.g., iBGP) at step 2, which in turn create a label switch path based on the BGP advertisement.

Figure 6:
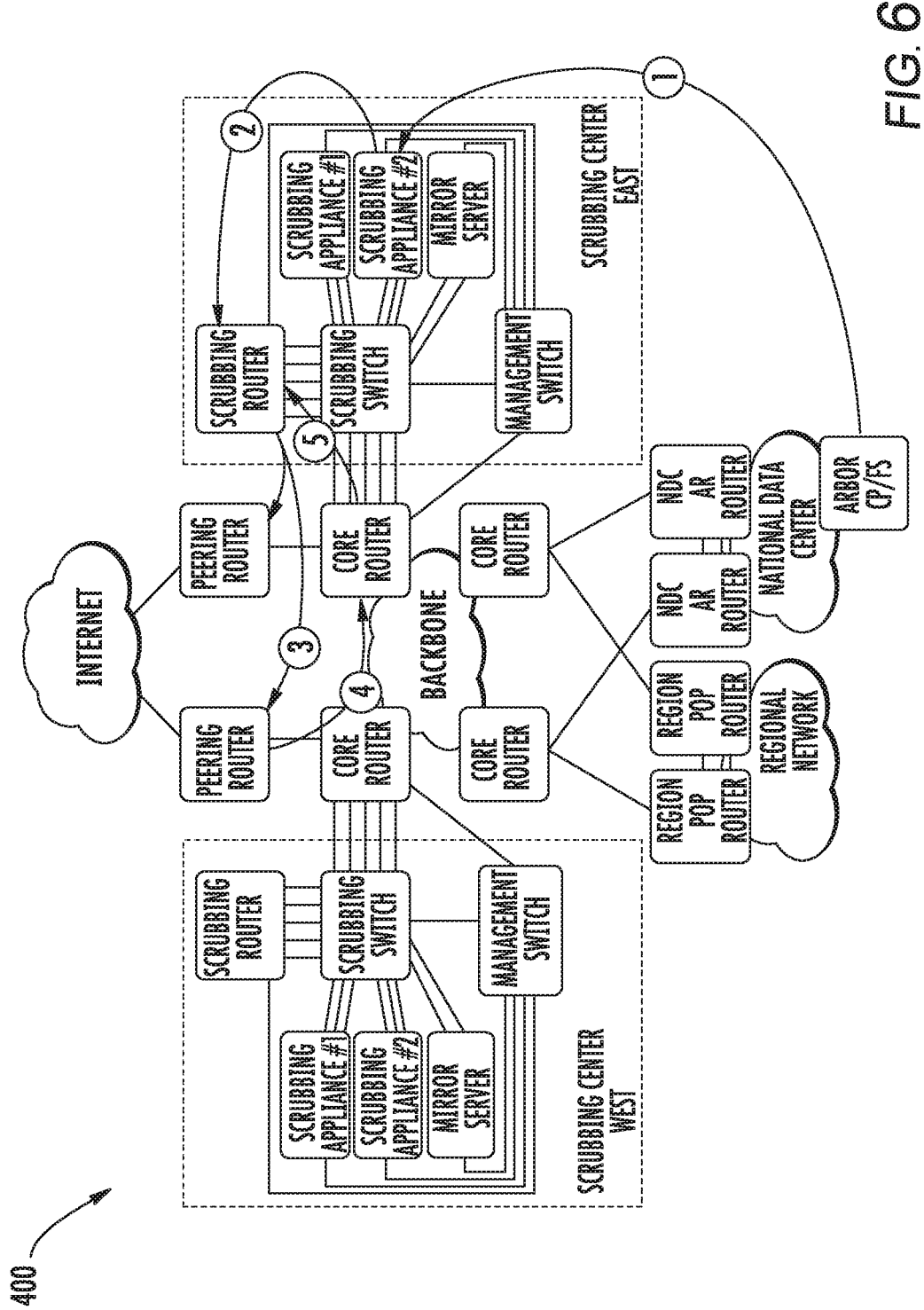
FIG. 6 is a logical block diagram of one embodiment of an MSO backbone showing exemplary remediation therein, according to the present disclosure.

FIG. 6 provides another graphical representation of the mitigation process triggered by attack detection. As shown, initially the data center identifies the presence of an attack (e.g., based on existing traffic flow analysis, etc.) per step 1.

Thereafter, an available scrubbing appliance provides a more specific route to the victim, which will override the existing route that is present in the peering router (step 2). This route has the next hop of the anycast address discussed above, and thus takes the label-switched route. The scrubbing router redistributes the label-switched route to all peering routers via an eBGP process per step 3. Thereafter, the peering routers redirect traffic destined for the victim's path route to the label-switch route per step 4.

Subsequently, any traffic directed to the victim's address will flow to the scrubbing router to be sent to the scrubbing appliance for cleaning and re-introduction (step 5).

Apparatus—

Figure 7A:
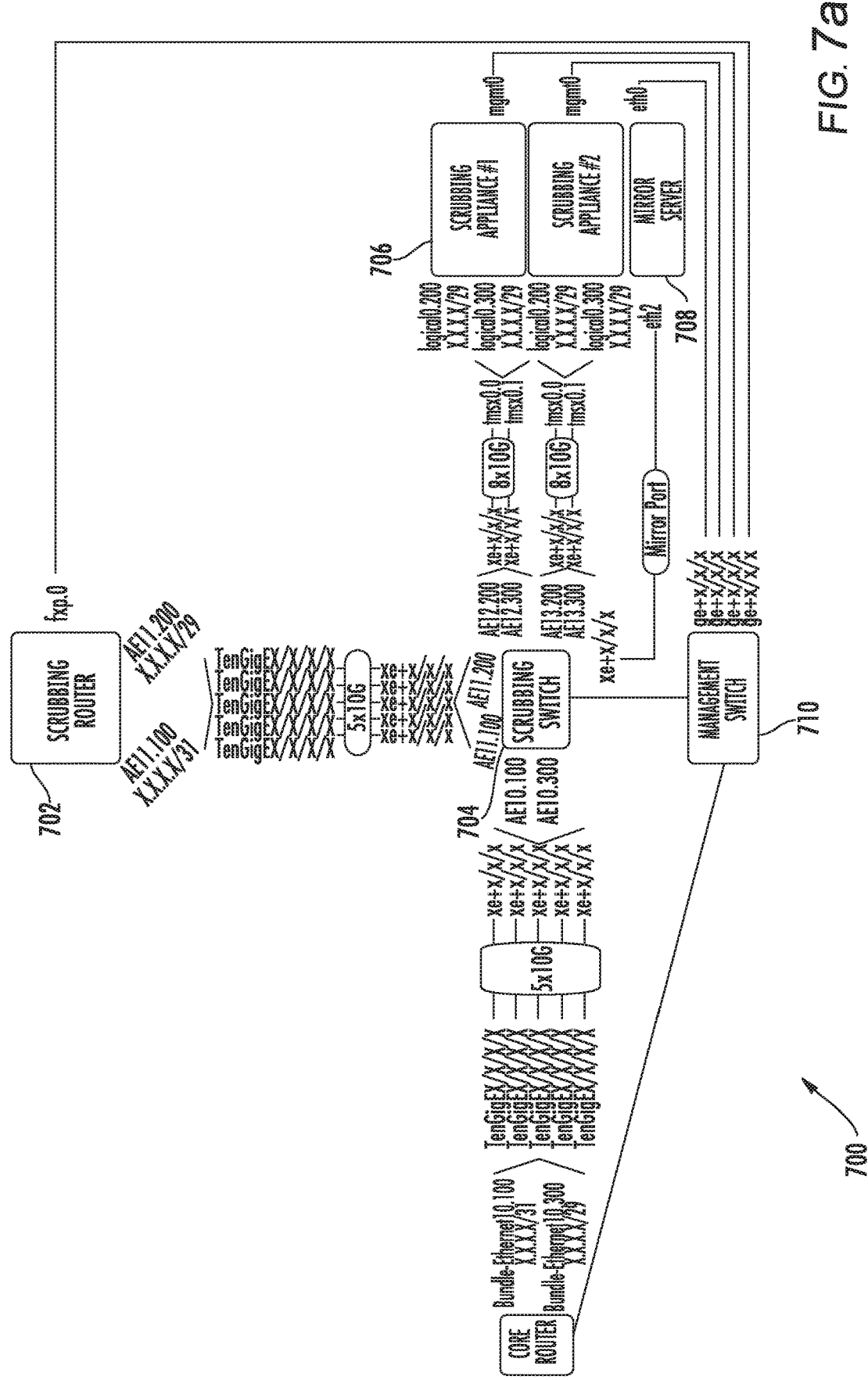
FIG. 7a is a logical block diagram of one embodiment of an MSO scrubbing complex showing various communication protocols and interfaces therein, according to the present disclosure.

FIG. 7a illustrates a scrubbing complex 700 that includes: a scrubbing router 702, a scrubbing switch 704, a number of scrubbing appliances 706, one or more mirror servers 708, and a management switch 710. Artisans of ordinary skill in the related arts will readily appreciate, given the present disclosure, that the scrubbing complex may be centralized, or virtualized, and/or distributed within other core network entities, the foregoing apparatus being purely illustrative.

In one exemplary embodiment, the scrubbing router 702 provides routing and/or firewall capabilities for the scrubbing complex. In some variants, internal routing control (via e.g., internal BGP) allows the scrubbing router to allocate dirty traffic to a plurality of scrubbing appliances based on a variety of factors including without limitation, first-in-first-out (FIFO), load balancing, priority, etc. Similarly, the scrubbing router 702 obfuscates the internal operations of the scrubbing complex from external network entities, thereby improving security and reducing overall network overhead and administration. In one exemplary implementation, the scrubbing router 702 provides an external BGP interface for communication with one or more external peer router entities of a backbone network.

In one implementation, the scrubbing switch 704 switches data packets received on its interfaces to one of three networks. In some variants, the networks are virtualized local area networks (VLANs). A first network includes the external backbone network and the scrubbing router 702. A second network includes the scrubbing router 702 and the scrubbing appliances 706. A third network includes the scrubbing appliances 706 and the external backbone network.

Figure 7B:
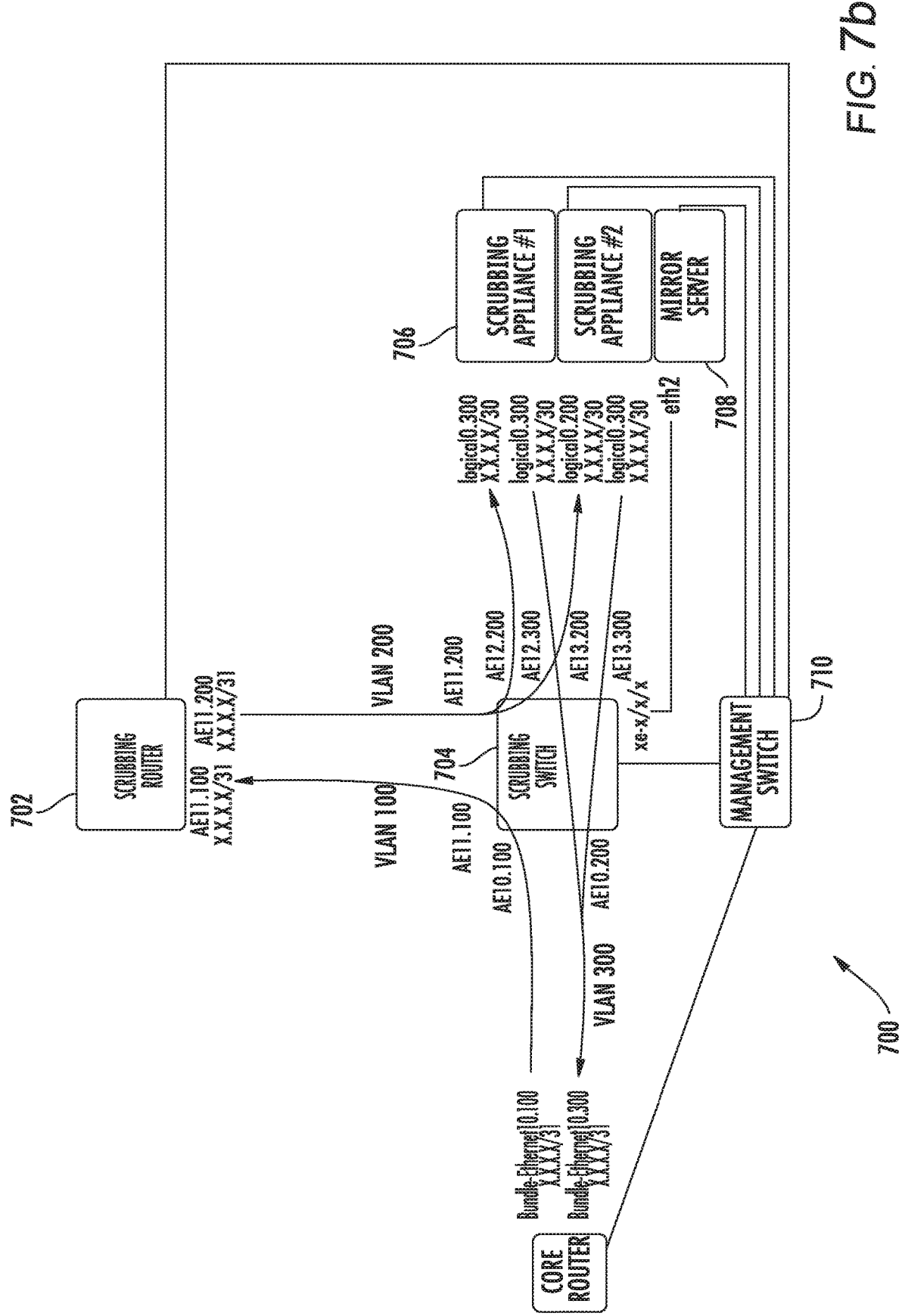
FIG. 7b is a logical block diagram showing general routing and flow of "dirty" traffic within the scrubbing complex of FIG. 7a, both before and after remediation.

As shown in FIG. 7b, during scrubbing operation, dirty traffic is passed from the first network to the second network via network address translation. Cleaned traffic can be directly re-introduced to the backbone network via the third network.

In one variant, the scrubbing switch is coupled to one or more core routers via a backbone network interface (not shown). In one such variant, the backbone network interface comprises Ethernet bundles of five (5) 10Gigabit (10G) interfaces. Other variants may have a greater or fewer number of interfaces, the illustrated embodiment being purely demonstrative. In some variants, routing internal to the scrubbing complex is based on hop-routed network addressing (e.g., TCP/IP and UDP/IP), using e.g., a virtualized local area network (VLAN).

Various embodiments of the present disclosure rely on scrubbing appliances 706 to clean dirty traffic. In one such variant, the scrubbing appliances 706 are configured to filter, divert, quarantine, and/or delete malicious traffic from a stream of dirty traffic. In some embodiments, the scrubbing appliances 706 can incorporate both prebuilt and custom mitigation templates available to defend against flood-based and application-based DDoS attacks. In some cases, the scrubbing appliances 706 may further comprise a mixed population of scrubbing appliances of varying capabilities so as to accommodate inevitable improvements in scrubbing capabilities.

In one exemplary embodiment, the management switch 710 is coupled to each of the scrubbing router 702, scrubbing switch 704, the scrubbing appliances 706, and the mirror server 708. The management switch 710 enables remote network management of the complex, etc. For example, in the event of a scrubbing appliance 706 failure, the management switch 710 can substitute the mirror server 708, thereby prolonging service and providing redundancy even during fault conditions.

Figure 8:
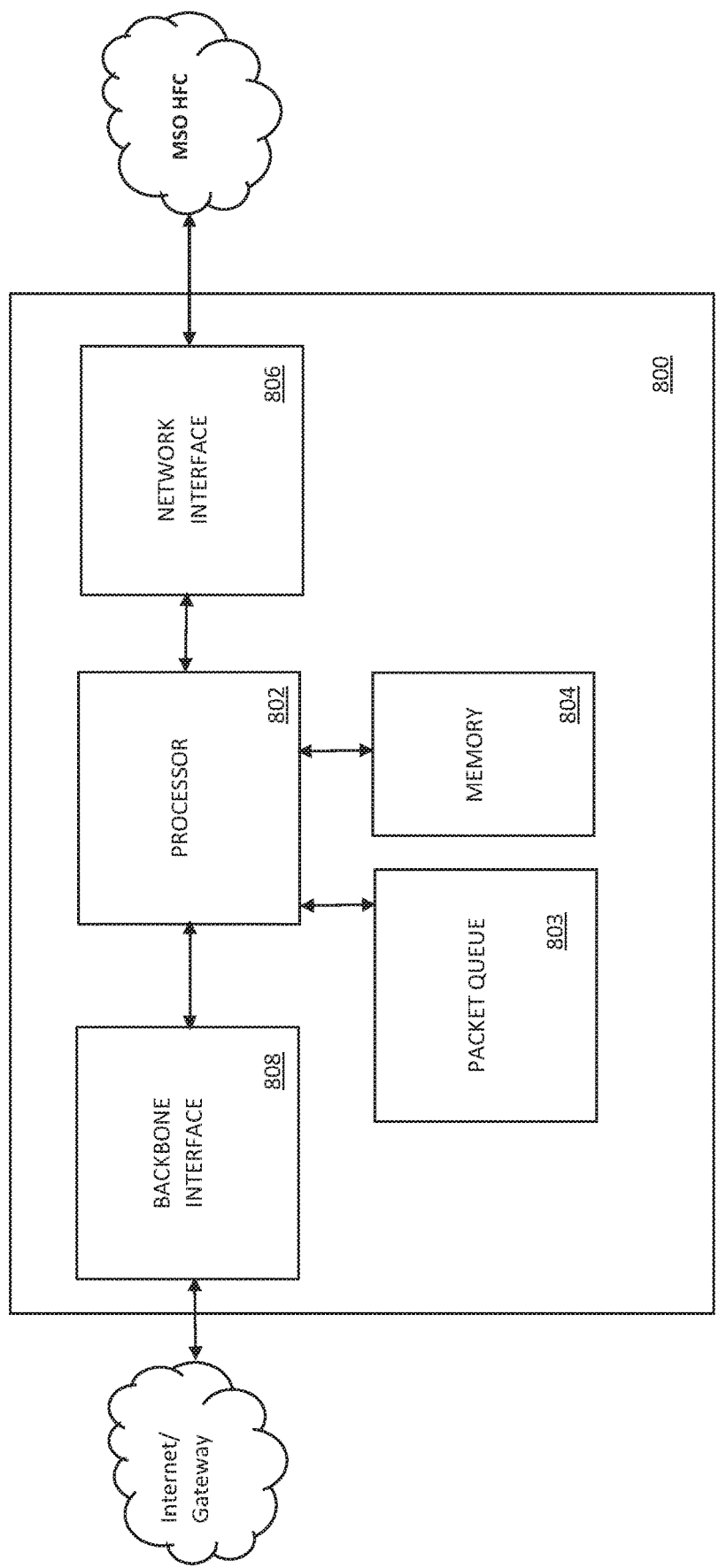
FIG. 8 is a functional block diagram of one embodiment of a network router apparatus according to the present disclosure.

FIG. 8 illustrates one exemplary peer router 800 according to the present disclosure. As shown, the peer router 800 includes: a processor 802, a packet queue 803, a memory module 804, a network interface 806, and a backbone interface 808. Artisans of ordinary skill in the related arts will readily appreciate, given the present disclosure, that the peer router may be virtualized and/or distributed within other core network entities, the foregoing apparatus being purely illustrative.

In one exemplary embodiment, the processor 802 may include one or more of a digital signal processor, microprocessor, field-programmable gate array, or plurality of processing components mounted on one or more substrates. The processor 802 may also comprise an internal cache memory. The processing subsystem is in communication with the packet queue 803 and the memory subsystem 804, the latter including memory which may for example comprise SRAM, flash, and/or SDRAM components. The memory subsystem may implement one or more of DMA type hardware, so as to facilitate data accesses as is well known in the art. The memory subsystem of the exemplary embodiment contains computer-executable instructions which are executable by the processor subsystem.

The processing apparatus 802 is configured to execute at least one computer program stored in memory 804 (e.g., non-transitory computer readable storage media). The computer program may include a plurality of computer readable instructions configured to encapsulate data received via the network interface 806 for delivery via the backbone interface 808. In one exemplary embodiment, the encapsulation includes the steps of unpacking the data received via the network interface 806, determining the appropriate route path, and encapsulating the data within a path-routed format for transmission via the backbone interface 808. In the event of a malicious attack, the network interface 806 is configured to filter out dirty traffic, determine the appropriate route path and insert a label for a scrubbing appliance, before delivering the data via the backbone interface 808. Alternatively (or even in conjunction in certain cases), protocol translation may also be performed on some or all of the packets as previously described.

In one embodiment, the processing apparatus 802 is configured to receive path information updates from a scrubbing complex, router, or appliance connected via the backbone interface 808. In one such variant, the processing apparatus 802 is configured to establish an external Border Gateway Protocol (eBGP) session with a scrubbing complex, router, or appliance of the network.

In one embodiment, the backbone network interface 808 is configured to transact one or more network address packets with other networked devices according to a path-routed network protocol. In one exemplary embodiment, the path-routed network protocol is based on a Multiprotocol Label Switching (MPLS) protocol which routes variable length data from one network node to another based on path labels created by the peer router, rather than looking up network addresses for the "next hop" in route tables of intermediary nodes. The network interface 808 operates in signal communication with the backbone of the content delivery network (CDN), such as that of FIG. 2. These interfaces might comprise for instance GbE (Gigabit Ethernet) or other interfaces of suitable bandwidth capability.

The network interface 806 is utilized in the illustrated embodiment for communication with the network protocols, such as via Ethernet. It will also be appreciated that the two interfaces 806, 808 may be aggregated together, and/or shared with other extant data interfaces, such as in cases where the controller entity function is virtualized within another component, such as an MSO network server performing other functions.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various embodiments, it will be understood that various omissions, substitutions, and changes in the form and details of the device or process illustrated may be made by those skilled in the art without departing from the disclosure. This description is in no way meant to be limiting, but rather should be taken as illustrative of the general principles of the disclosure. The scope of the disclosure should be determined with reference to the claims.

It will be further appreciated that while certain steps and aspects of the various methods and apparatus described herein may be performed by a human being, the disclosed aspects and individual methods and apparatus are generally computerized/computer-implemented. Computerized apparatus and methods are necessary to fully implement these aspects for any number of reasons including, without limitation, commercial viability, practicality, and even feasibility (i.e., certain steps/processes simply cannot be performed by a human being in any viable fashion).

What is claimed is:

1. A computerized method of operating a managed content distribution network in data communication with an internetwork to compensate for one or more malicious internetwork-originated attacks directed at subscribers of the managed content distribution network, the computerized method comprising:

processing packetized data traffic received by the managed content distribution network from the internetwork to identify at least portions of the packetized data traffic having Internet Protocol (IP) packet header information, the IP packet header information comprising a destination address corresponding to at least one computerized user device associated with at least one subscriber of the managed content distribution network;

inserting, using at least one router in data communication with an ingress of the packetized data traffic within the managed content distribution network, data into the at least portions of the packetized data traffic, the inserting preserving the destination address for subsequent use by the managed content distribution network;

subsequent to the inserting and based at least on the data, switching the at least portions of the packetized data traffic to a processing entity, the processing entity being within the managed content distribution network;

processing the at least portions of the packetized data traffic using the processing entity, the processing causing at least one of: (i) filtration of at least a portion of the switched identified portions of the packetized data traffic, and (ii) switching of at least a portion of the at least portions of the packetized data traffic to an intermediate destination;

collecting data relating to one or more metrics characterizing the one or more malicious internetwork-originated attacks, wherein the collected data is configured to enable anticipation of future malicious internetwork-originated attacks; and processing the collected data relating to the one or more metrics characterizing the one or more malicious internetwork-originated attacks to generate data relating to the future malicious internetwork-originated attacks, the one or more metrics characterizing the one or more malicious internetwork-originated attacks comprising one or more of: (i) degree of contamination, (ii) scrubbing time, or (iii) indeterminate traffic;

wherein the processing of the packetized data traffic, the inserting of the data, the switching of the at least portions of the packetized data traffic, and the processing of the at least portions of the packetized data traffic cooperate to enable the at least one computerized user device to continue operation after the one or more malicious internetwork-originated attacks have been initiated.

2. The computerized method of claim 1, wherein the processing the packetized data traffic, and the inserting, the switching and the processing of the at least portions of the packetized data traffic are conducted at least in part automatically using computerized processes of one or more of: (i) the managed content distribution network, (ii) the at least one router, and (iii) the processing entity, to minimize delays in providing the compensation.

3. The computerized method of claim 1, further comprising:
associating the at least portions of the packetized data traffic having the IP packet header information to pre-programmed routing data; and
determining at least one of: (i) an exit interface and (ii) a path, from a second router of the managed content distribution network.

4. The computerized method of claim 1, further comprising using at least the collected data relating to the one or more metrics in determining one or more traffic patterns or origination addresses of the one or more malicious internetwork-originated attacks.

5. The computerized method of claim 1, further comprising transmitting the data relating to the one or more metrics from the at least one router or the processing entity, to at least one other network entity within the managed content distribution network, in order to enable the at least one other network entity to participate in malicious traffic mitigation schemes.

6. The computerized method of claim 1, further comprising transmitting the data relating to the one or more metrics from the managed content distribution network to at least one off-network entity outside of the managed content distribution network, in order to enable the at least one off-network entity to participate in malicious traffic mitigation schemes.

7. The computerized method of claim 1, wherein inserting the data comprises inserting switching-layer protocol address data into the at least portions of the packetized data traffic.

8. The computerized method of claim 1, further comprising:
removing the at least portions of the packetized data traffic, the removing occurring after completion of the processing of the packetized data traffic, the inserting of the data, the switching of the at least portions of the packetized data traffic, and the processing of the at least portions of the packetized data traffic; and
transmitting the at least portions of the packetized data traffic to the at least one computerized user device.

9. The computerized method of claim 1, further comprising:
identifying prospectively spoofed data traffic received by a network entity within the managed content distribution network for flagging;
determining whether the identified prospectively spoofed data traffic was transmitted by a particular network address; and
based at least on the determining, ignoring the identified prospectively spoofed data traffic.

10. The computerized method of claim 1, wherein the processing the at least portions of the packetized data traffic using the processing entity comprises using internal routing infrastructure, distributing the at least portions of the packetized data traffic among a plurality of scrubbing devices of the processing entity.

11. The computerized method of claim 10, further comprising enabling the processing entity to hide data indicative of the internal routing infrastructure from the managed content distribution network.

12. The computerized method of claim 10, wherein the distributing comprises distributing the at least portions of the packetized data traffic among the plurality of scrubbing devices using a load balancing algorithm.

13. The computerized method of claim 10, wherein the plurality of scrubbing devices comprises at least a first scrubbing device and a second scrubbing device, the first scrubbing device more capable of processing data traffic than the second scrubbing device; and
wherein the distributing comprises transmitting higher priority data traffic of the at least portions of the packetized data traffic to the first scrubbing device and transmitting lower priority data traffic of the at least portions of the packetized data traffic to the second scrubbing device.

14. The computerized method of claim 10, wherein the plurality of scrubbing devices comprises at least a first scrubbing device and a second scrubbing device, the first scrubbing device more capable of processing data traffic than the second scrubbing device; and
wherein the distributing comprises (i) transmitting traffic associated with metropolitan areas to the first scrubbing device, and (ii) transmitting traffic associated with non-metropolitan areas to the second scrubbing device.

15. The computerized method of claim 10, wherein the plurality of scrubbing devices comprises at least a first scrubbing device and a second scrubbing device, and wherein the distributing comprises (i) transmitting traffic associated with a first geographic region to the first scrubbing device, and (ii) transmitting traffic associated with a second geographic region, different from the first geographic region, to the second scrubbing device.

16. A computerized network apparatus configured to at least mitigate one or more effects of external attacks on one or more users of a managed content distribution network, the computerized network apparatus comprising:
- one or more network interfaces configured to receive a plurality of data packets from an external network;
- a scrubbing apparatus configured to receive and remediate data packets forwarded thereto, the scrubbing apparatus comprising a plurality of scrubbing devices; and
- one or more processing entities in data communication with the one or more network interfaces and the scrubbing apparatus, the one or more processing entities configured to:
  - (i) evaluate the plurality of data packets received by the one or more network interfaces;
  - (ii) detect ones of the plurality of data packets, the detection comprising:
    - an identification of prospectively spoofed data traffic received by a network entity within the managed content distribution network; and
    - a determination of whether the identified prospectively spoofed data traffic was transmitted by a particular network address; and
  - (iii) process the identified prospectively spoofed data traffic so as to enable redirection of the prospectively spoofed data traffic to the scrubbing apparatus, the processing configured to, based at least on the determination, ignore the identified prospectively spoofed data traffic;
  - wherein the scrubbing apparatus obviates a need for use of any network-addressed tunnels at least in an edge portion of the data network.

17. The computerized network apparatus of claim 16, wherein:
- the plurality of data packets have routing data associated with at least two different geographic regions comprising at least a first region and a second region;
- the plurality of scrubbing devices comprises at least a first scrubbing device and a second scrubbing device; and
- the first scrubbing device is configured to only receive data packets associated with the first region, and the second scrubbing device is configured to only receive data packets associated with the second region.

18. The computerized network apparatus of claim 16, wherein the plurality of scrubbing devices comprises at least a first scrubbing device and a second scrubbing device, the first scrubbing device more capable of remediating data packets than the second scrubbing device; and
- wherein the first scrubbing device is configured to receive first data packets, the second scrubbing device is configured to receive second data packets, the first data packets having higher priority than the second data packets.

19. A network apparatus for use within a data network, the network apparatus comprising:
- a processing apparatus;
- a data traffic interface in data communication with the processing apparatus and configured to at least receive a plurality of data packets originated from an internetwork, the plurality of data packets having at least a network destination address, the network destination address specified by a network-layer protocol associated with the data network;
- at least one data storage apparatus in data communication with the processing apparatus, the at least one data storage apparatus configured to store at least the plurality of received data packets; and
- computerized logic operative to execute on the processing apparatus, the computerized logic comprising a plurality of instructions which are configured to, when executed by the processing apparatus, cause the network apparatus to:
  - store the plurality of data packets at least temporarily in the at least one data storage apparatus;
  - identify at least a portion of the plurality of data packets for further processing;
  - insert a switching-layer protocol address into the at least the portion of the plurality of data packets such that a routing loop is not introduced in the data network;
  - cause utilization of the switching-layer protocol address to route the at least the portion of the plurality of data packets from the processing apparatus to a second processing apparatus, so as to substantially frustrate a network attack, the routing of the at least the portion of the plurality of data packets from the processing apparatus to the second processing apparatus being performed without the use of network-addressed tunnels;
  - collect data relating to one or more metrics characterizing the network attack, wherein the collected data is configured to enable anticipation of future malicious internetwork-originated attacks; and
  - process the collected data relating to the one or more metrics to generate data relating to the future malicious internetwork-originated attacks, the one or more metrics comprising one or more of: (i) degree of contamination, (ii) scrubbing time, or (iii) indeterminate traffic.

20. The network apparatus of claim 19, wherein:
- the insertion of the switching-layer protocol address into the at least the portion of the plurality of data packets is performed without altering the network destination address; and
- the plurality of instructions are further configured to, when executed by the processing apparatus, cause the network apparatus to cause distribution of the data relating to the one or more metrics to one or more network entities, the distribution enabling at least mitigation of one or more subsequent network attacks.

* * * * *